United States Patent
Hsiao et al.

(10) Patent No.: US 8,184,726 B2
(45) Date of Patent: May 22, 2012

(54) METHOD AND APPARATUS FOR MULTI-RATE CONTROL IN A MULTI-CHANNEL COMMUNICATION SYSTEM

(75) Inventors: Chang-Lung Hsiao, Hsinchu (TW);
Ren-Jr Chen, Sanchong (TW);
Chung-Lien Ho, Gueishan Township (TW); Chien-Min Lee, Sinjhuang (TW); Wern-Ho Sheen, Minsyong Township (TW)

(73) Assignee: Industrial Technology Research Institute, Hsinchu (TW)

( * ) Notice: Subject to any disclaimer, the term of this patent is extended or adjusted under 35 U.S.C. 154(b) by 603 days.

(21) Appl. No.: 12/177,070

(22) Filed: Jul. 21, 2008

(65) Prior Publication Data

US 2009/0067543 A1  Mar. 12, 2009

Related U.S. Application Data

(60) Provisional application No. 60/971,236, filed on Sep. 10, 2007, provisional application No. 60/986,228, filed on Nov. 7, 2007, provisional application No. 60/988,051, filed on Nov. 14, 2007.

(51) Int. Cl.
*H04K 1/10* (2006.01)
(52) U.S. Cl. ........ 375/260; 375/261; 375/262; 375/267; 375/295; 375/298; 375/347; 375/349
(58) Field of Classification Search ................. 375/295, 375/297, 260, 298, 261, 262, 347, 349, 267; 370/203, 204, 205, 206, 207, 208, 209, 210
See application file for complete search history.

(56) References Cited

U.S. PATENT DOCUMENTS

| | | | |
|---|---|---|---|
| 6,473,467 B1 | 10/2002 | Wallace et al. |
| 6,829,470 B2 | 12/2004 | Kogiantis et al. |
| 7,120,199 B2 | 10/2006 | Thielecke et al. |
| 7,154,960 B2 | 12/2006 | Liu et al. |
| 7,194,042 B2 | 3/2007 | Walton et al. |

(Continued)

FOREIGN PATENT DOCUMENTS

WO  WO2006114855  * 11/2006

OTHER PUBLICATIONS

3rd Generation Partnership Project, "Technical Specification Group Radio Access Network; Evolved Universal Terrestrial Radio Access (E-UTRA); Physical Channels and Modulation," 36.211 v1.2.2, Release 8, Jul. 2007 (pp. 1-45).

(Continued)

*Primary Examiner* — Dhaval Patel
(74) *Attorney, Agent, or Firm* — Alston & Bird LLP

(57) ABSTRACT

An apparatus for data processing in a multi-channel communication system is provided. The apparatus includes an encoder configured to encode a number of bits for transmission via channels in the multi-channel communication system into coded bits and split the coded bits into a number of first sets of bits at a first ratio, a number of first rate units coupled to the encoder, each of the first rate units being configured to adjust one set of the first sets of bits in size at at least one rate, and a controller configured to assign the first ratio to the encoder and the at least one rate to each of the first rate units based on conditions of the channels.

34 Claims, 34 Drawing Sheets

U.S. PATENT DOCUMENTS

| | | | |
|---|---|---|---|
| 7,260,366 B2* | 8/2007 | Lee et al. | 455/102 |
| 7,280,606 B2 | 10/2007 | Kim et al. | |
| 2003/0060173 A1 | 3/2003 | Lee et al. | |
| 2004/0125900 A1* | 7/2004 | Liu et al. | 375/347 |
| 2005/0193310 A1* | 9/2005 | Obuchi et al. | 714/752 |
| 2006/0023667 A1* | 2/2006 | Tanabe et al. | 370/334 |
| 2006/0023680 A1 | 2/2006 | Oh et al. | |
| 2006/0039409 A1 | 2/2006 | Lampinen | |
| 2006/0056534 A1 | 3/2006 | Ionescu et al. | |
| 2006/0107167 A1* | 5/2006 | Jeong et al. | 714/748 |
| 2008/0013610 A1* | 1/2008 | Varadarajan et al. | 375/221 |
| 2008/0080641 A1 | 4/2008 | Kim | |
| 2008/0192705 A1* | 8/2008 | Suzuki | 370/335 |
| 2008/0212714 A1* | 9/2008 | Varanasi et al. | 375/299 |
| 2009/0041110 A1 | 2/2009 | Malladi | |
| 2010/0077275 A1* | 3/2010 | Yu et al. | 714/752 |

OTHER PUBLICATIONS

Paulraj, et al., "An Overview of MIMO Communications—A Key to Gigabit Wireless," Proceedings of the IEEE, vol. 92, No. 2, Feb. 2004 (pp. 198-218).

I.E. Telatar, "Capacity of Multi-Antenna Gaussian Channels," *Tech Repo., AT&T Bell Labs*, 1995, 28 pages.

Office Action for U.S. Appl. No. 12/536,032 dated Oct. 6, 2011.

\* cited by examiner

METHOD AND APPARATUS FOR MULTI-RATE CONTROL IN A MULTI-CHANNEL COMMUNICATION SYSTEM

CROSS-REFERENCE TO RELATED APPLICATIONS

This application claims the benefit of U.S. Provisional Application Nos. 60/971,236, filed Sep. 10, 2007, 60/986,228, filed Nov. 7, 2007 and 60/988,051, filed Nov. 14, 2007, which are incorporated herein by reference.

BACKGROUND

This application generally relates to data communications and, more particularly, to data processing for transmission in a multi-channel communication system.

A multi-channel communication system may refer to a wireless communication system capable of transmitting information such as voice and data between a transmitter and a receiver, which may have more than one transmitter antenna and receiver antenna, respectively. Such a multi-channel system may include, for example, a multiple-input multiple-output (MIMO) communication system, an orthogonal frequency division modulation (OFDM) system and a MIMO system based on OFDM. A MIMO system may employ multiple transmitter antennas and multiple receiver antennas to exploit spatial diversity to support a number of spatial subchannels, each of which may be used to transmit data. An OFDM system may partition an operating frequency band into a number of frequency subchannels, each of which is associated with a respective subcarrier on which data may be modulated. A multi-channel communication system thus may support a number of "transmission" channels, each of which may correspond to a spatial subchannel in a MIMO system, a frequency subchannel in an OFDM system, or a spatial subchannel of a frequency subchannel in a MIMO system that utilizes OFDM.

In a multi-channel communication system, however, transmission channels may experience different channel conditions due to, for example, different fading and multipath effects, and may therefore result in different signal-to-interference-plus-noise ratios (SNRs). Consequently, the transmission capacities (i.e., the information bit rates) that may be supported by the transmission channels for a particular level of performance may be different from channel to channel. Moreover, the channel conditions may often vary over time. As a result, the bit rates supported by the transmission channels may also vary with time. To alleviate the channel effects, a coding and modulation scheme (MCS) may be configured to process data prior to transmission via the channels so as to enhance transmission capacities. The MCS may be divided into a single codeword (SCW) architecture and a multi codeword (MCW) architecture.

FIG. 1A is a schematic block diagram of a prior art transmitter 1 based on an SCW scheme in a MIMO system. Referring to FIG. 1A, the transmitter 1 may include an encoder 11, a rate matcher 12, a channel interleaver 13, a modulator 14, a layer mapper 15, a precoder 16, a number of antennas 17-1 to 17-$n$ and a controller 18. The encoder 11 receives a code block containing information bits in a bit stream. Encoder 11 then encodes the received information bits with a code scheme, for example, a 1/3-rate Turbo code (TC) with tail bit addition. In the rate matcher 12, rate matching is performed under the control of the controller 18, which in turn may receive a feedback signal from a receiver to determine a code rate for the channel.

FIG. 1B is a flow diagram illustrating prior art data processing in terms of bit size in the transmitter 1 illustrated in FIG. 1A. Referring to FIG. 1B and also FIG. 1A, at step 110, a number of "$N_b$" information bits are received by the encoder 11. At step 120, after the 1/3-rate Turbo coding and the addition of, for example, twelve (12) tail bits, the coded bits have a size of ($3 N_b+12$) bits. At step 130, puncturing or repetition, depending on the channel condition, may be performed in the rate matcher 12, resulting in an output of $N_p$ bits, where $N_p$ is the total amount of bits to be transmitted. The number of $N_p$, and in turn the code rate $N_b/N_p$, may be determined by the controller 18 according to the channel condition. At step 140, the $N_p$ bits are interleaved in the channel interleaver 13. At step 150, the modulator 14 modulates the interleaved $N_p$ bits and generates a number of "$N_p/m$" symbols, where the value "m" may also be determined by the controller 18. Next, at step 160, the modulated $N_p/m$ symbols are de-multiplexed in the layer mapper 15 before precoded in the precoder 16. For simplicity, it may be assumed that two antennas 17-1 and 17-2 are utilized to transmit $N_p/2$ m symbols each.

Although the SCW scheme described and illustrated with reference to FIG. 1A may have a relatively simple structure and a relatively low feedback overhead, the performance such as error probability and data rate may not be desirable. Furthermore, due to the time-varying nature of link conditions, the channel 17-1, for example, may have a better link condition than the channel 17-2 during a certain period of transmission and therefore should transmit more coded bits or more important bits than the channel 17-2. However, in the transmitter 1, the channels 17-1 and 17-2 transmit substantially the same number of coded bits, which may not enhance the transmission capacities. Moreover, important bits and less important bits are not separated from each other and may be evenly transmitted in the channels 17-1 and 17-2.

FIG. 2A is a schematic block diagram of an exemplary transmitter 2 based on an MCW scheme in a MIMO system. Referring to FIG. 2A, the transmitter 2 may include a splitter 29, encoders 21-1 to 21-$n$, rate matchers 22-1 to 22-$n$, channel interleavers 23-1 to 23-$n$, modulators 24-1 to 24-$n$, a layer mapper 25, a precoder 26, antennas 27-1 to 27-$p$ and a controller 28. The splitter 29 may divide incoming information bits into a number of "n" groups. Each group of information bits is then processed in an independent path, for example, a path 20 in a dashed block including the encoder 21-1, rate matcher 22-1, channel interleaver 23-1 and modulator 24-1. A modulated symbol from the path 20 may subsequently be processed by the layer mapper 25 and the precoder 26 before transmitted on one or more of the antennas 27-1 to 27-$p$. In the transmitter 2, the controller 28 can determine a code rate for each channel according to a feedback signal from a receiver. The feedback signal may include information on a link condition of each channel measured at the receiver.

FIG. 2B is a flow diagram illustrating data processing in terms of bit size in the transmitter 2 illustrated in FIG. 2A. Referring to FIG. 2B and also FIG. 2A, at step 210, the splitter 29 receives a number of $N_b$ information bits. Then, at step 220, the splitter 29 splits the $N_b$ bits into "n" groups of bits. For simplicity, two groups of bits, i.e., n=2, are illustrated. Accordingly, the $N_b$ bits may be divided into a first group containing $N_{b,0}$ bits and a second group containing $N_{b,1}$ bits, where $N_b=N_{b,0}+N_{b,1}$. At step 230, the 1/3-rate TC with tail bit addition coding scheme is performed in the encoders 21-1 and 21-2, which then respectively generate $N_{c,0}$ bits and $N_{c,1}$ bits, where $N_{c,0}$ and $N_{c,1}$ satisfy $N_{c,0}+N_{c,1}=3 N_b+12$. At step

240, rate matching including puncturing or repetition is performed in the rate matchers 22-1 and 22-2, each of which generates an output of $N_p/2$ bits, where $N_p$ is the total amount of bits to be transmitted. At step 250, two groups of $N_p/2$ bits are interleaved in the channel interleavers 23-1 and 23-2, respectively. At step 260, each of the modulators 24-1 and 24-2 modulates the $N_p/2$ bits and generates a number of $N_p/2$ m symbols. At step 270, the modulated $N_p/2$ m symbols are de-multiplexed in the layer mapper 25 before precoded in the precoder 26. For simplicity, it may be assumed that two antennas 27-1 and 27-2 are utilized to transmit the $N_p/2$ m symbols each.

The transmitter 2 shown in FIG. 2A can enhance transmission capacities. For example, assuming that the channel 27-1 is better than the channel 27-2 in a certain time duration, the controller 28 may increase the puncturing rate in the rate matcher 22-1 so that the channel 27-1 may support more information bits. Nonetheless, the transmitter 2 may require a relatively complicated hardware structure. Furthermore, a total number of "n" decoders may be required at the receiver side, which may dramatically increase the cost of the MIMO system.

BRIEF SUMMARY

Examples of the present invention may provide an apparatus for data processing in a multi-channel communication system, the apparatus comprising an encoder configured to encode a number of bits for transmission via channels in the multi-channel communication system into coded bits and split the coded bits into a number of first sets of bits at a first ratio, a number of first rate units coupled to the encoder, each of the first rate units being configured to adjust one set of the first sets of bits in size at at least one rate, and a controller configured to assign the first ratio to the encoder and the at least one rate to each of the first rate units based on conditions of the channels.

Some examples of the present invention may also provide an apparatus for data processing in a multi-channel communication system, the apparatus comprising a first splitter configured to split a number of bits for transmission via channels in the multi-channel communication system into a number of first sets of bits at a first ratio, a number of encoders coupled to the first splitter, each of the encoders being configured to encode one set of the first sets of bits into a second set of bits, a number of first rate units each coupled to one of the encoders, each of the first rate units being configured to adjust the second set of bits from the one encoder in size at at least one rate, and a controller configured to assign the first ratio to the splitter and the at least one rate to each of the first rate units based on conditions of the channels.

Examples of the present invention may further provide an apparatus for data processing in a multi-channel communication system, the apparatus comprising an encoder configured to encode a number of bits for transmission via at least a first channel and a second channel in the multi-channel communication system into coded bits, the coded bits including a first group of bits having a first degree of influence on communication quality and a second group of bits having a second degree of influence on communication quality, the first degree being greater than the second degree, a rate unit configured to adjust the second group of bits in size at a first rate, and a controller configured to receive a signal containing information on conditions of the first channel and the second channel, assign the first rate to the rate unit based on the condition of the second channel and identify one of the first channel and the second channel that has a better channel condition, wherein the first group of bits are transmitted via the one of the first channel and the second channel that has a better channel condition and the second group of bits are transmitted via the other one of the first channel and the second channel.

Examples of the present invention may also provide a method of data processing in a multi-channel communication system, the method comprising receiving a number of information bits, generating a number of symbols based on the information bits, arranging the symbols in a symbol sequence, transmitting the symbols in accordance with the symbol sequence via a number of channels in a first sequence of the channels, receiving a message of re-transmitting the symbols, and re-transmitting the symbols in accordance with the symbol sequence via the channels in a second sequence of the channels, the first sequence and the second sequence being diffeent from each other.

BRIEF DESCRIPTION OF THE DRAWINGS

The foregoing summary as well as the following detailed description of the preferred embodiments of the present invention will be better understood when read in conjunction with the appended drawings. For the purposes of illustrating the invention, there are shown in the drawings embodiments which are presently preferred. It is understood, however, that the invention is not limited to the precise arrangements and instrumentalities shown. In the drawings.

DETAILED DESCRIPTION

Reference will now be made in detail to the present examples of the invention illustrated in the accompanying drawings. Wherever possible, the same reference numbers will be used throughout the drawings to refer to the same or like portions.

Figure 1A:
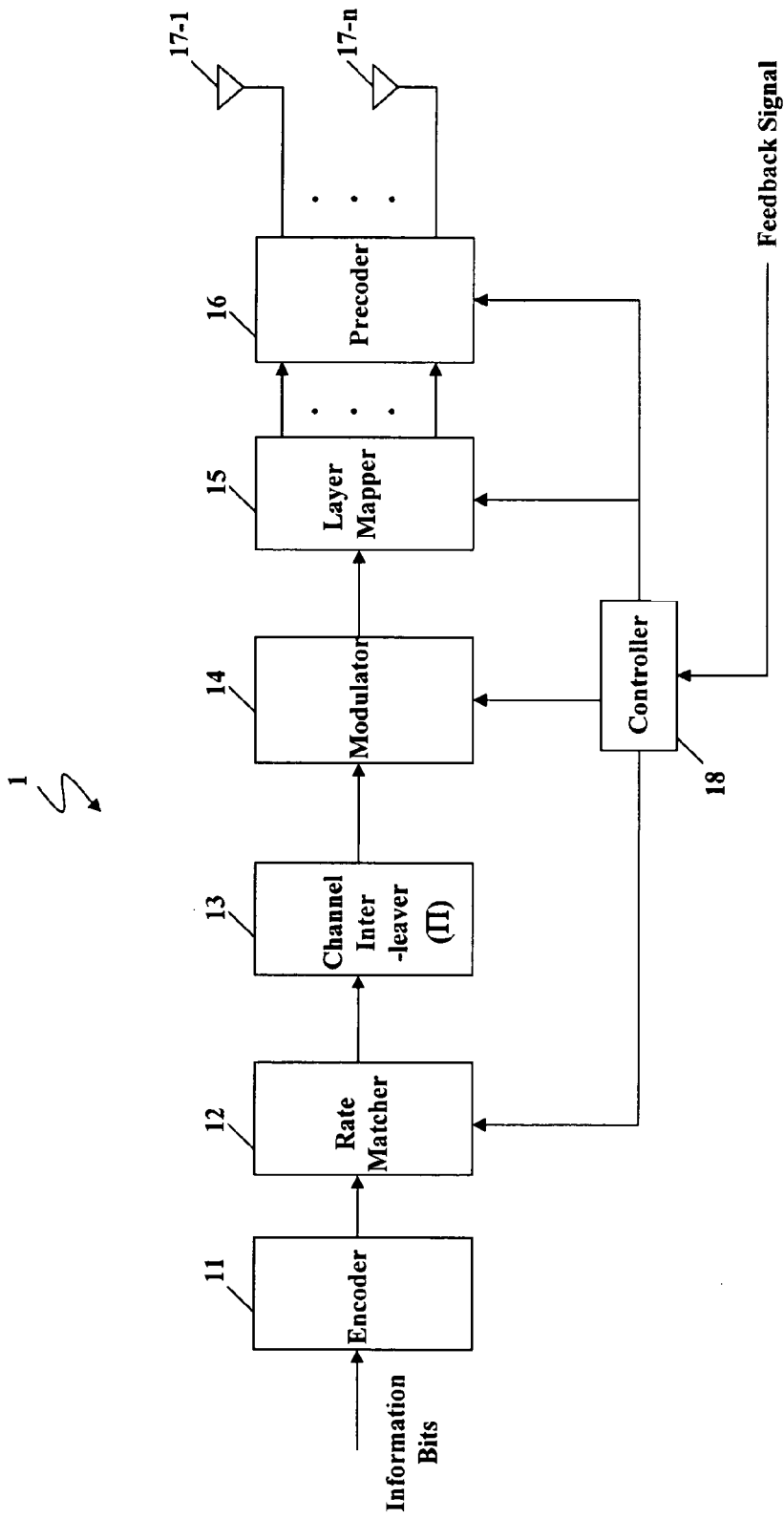
FIG. 1A is a schematic block diagram of a prior art transmitter based on a single codeword (SCW) scheme in a multiple input multiple output (MIMO) system.
Figure 1B:
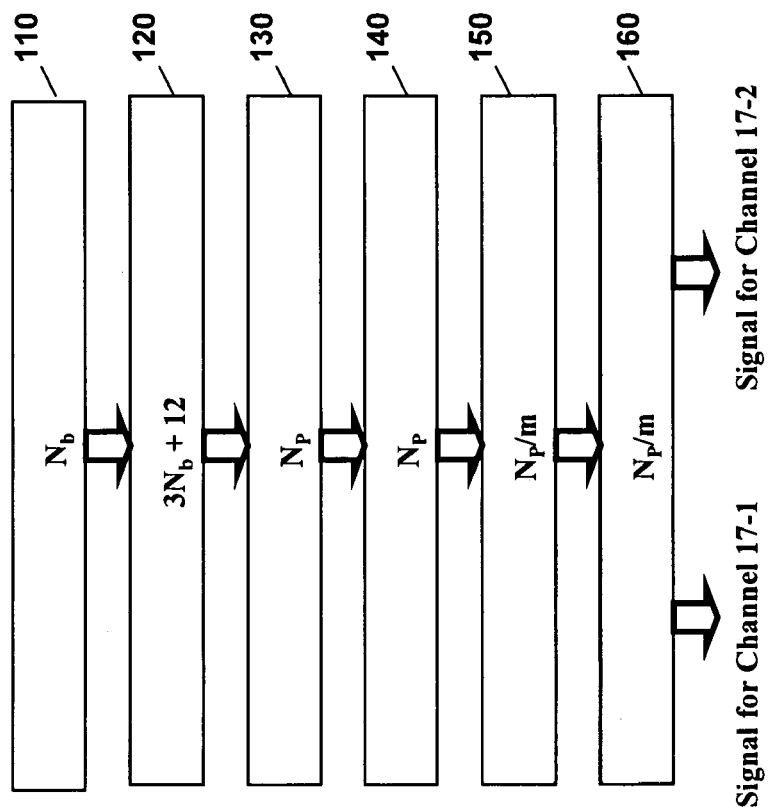
FIG. 1B is a flow diagram illustrating prior art data processing in terms of bit size in the transmitter illustrated in FIG. 1A.
Figure 2A:
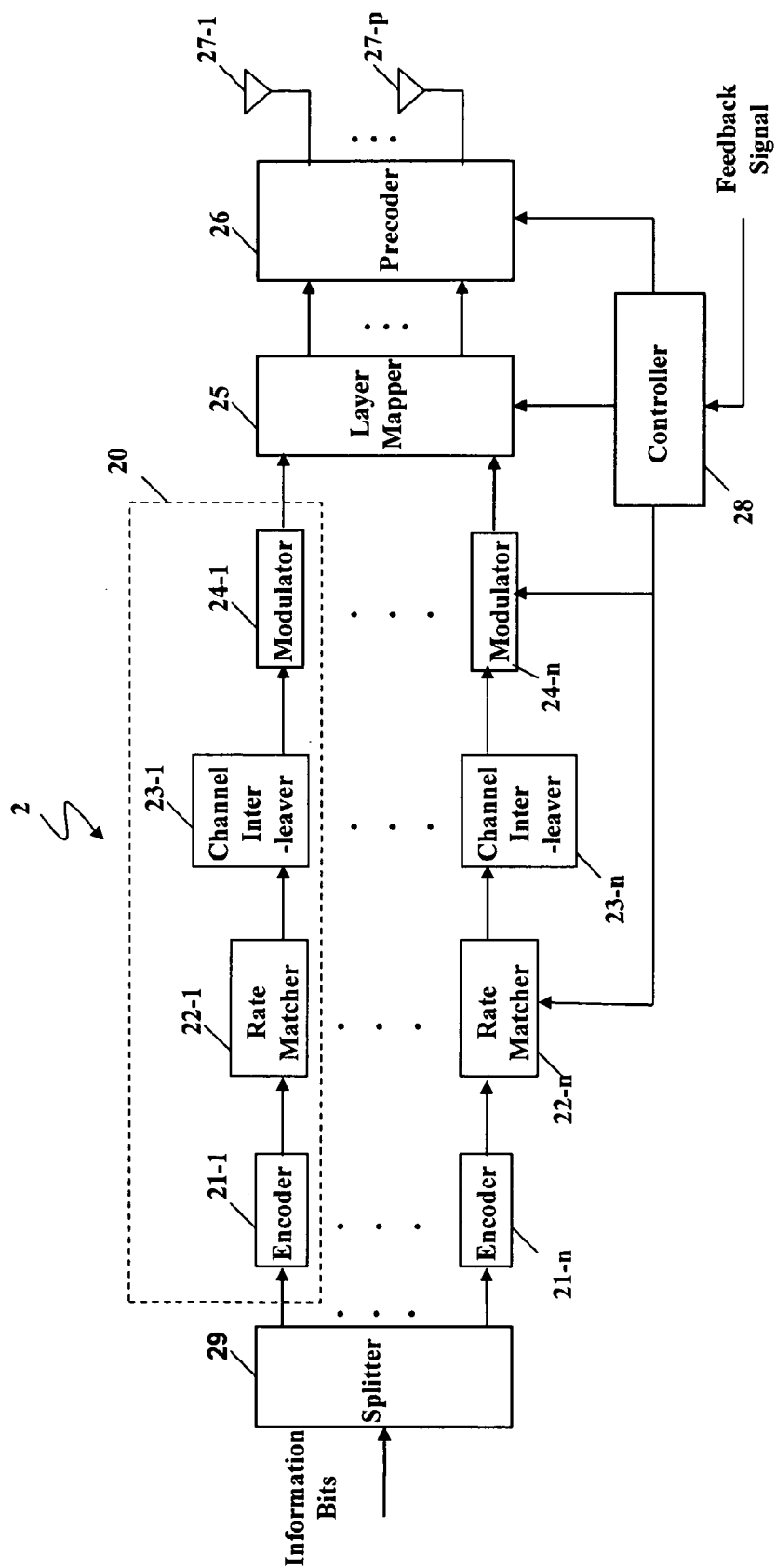
FIG. 2A is a schematic block diagram of a prior art transmitter based on a multiple codeword (MCW) scheme in a MIMO system.
Figure 2B:
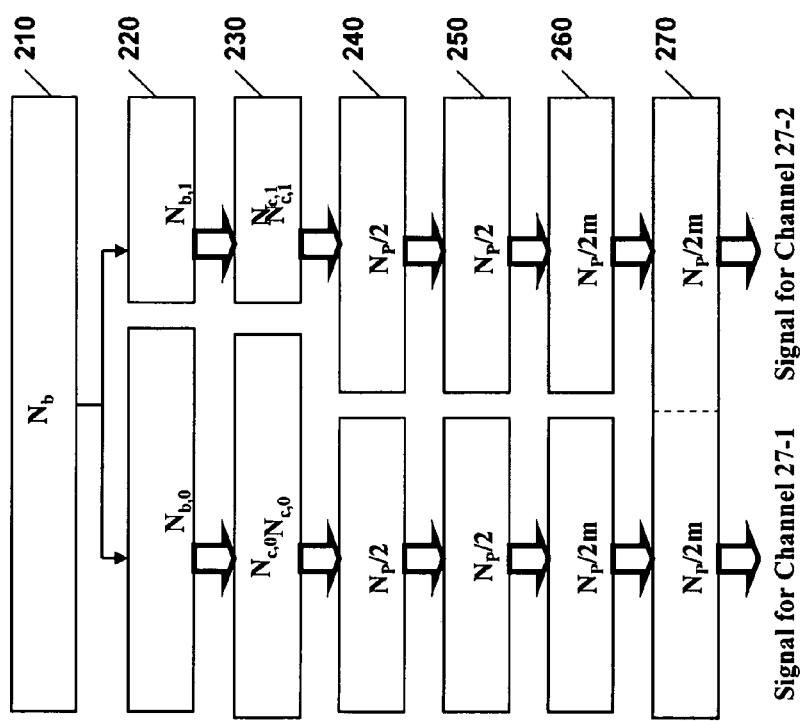
FIG. 2B is a flow diagram illustrating prior art data processing in terms of bit size in the transmitter illustrated in FIG. 2A.
Figure 3A:
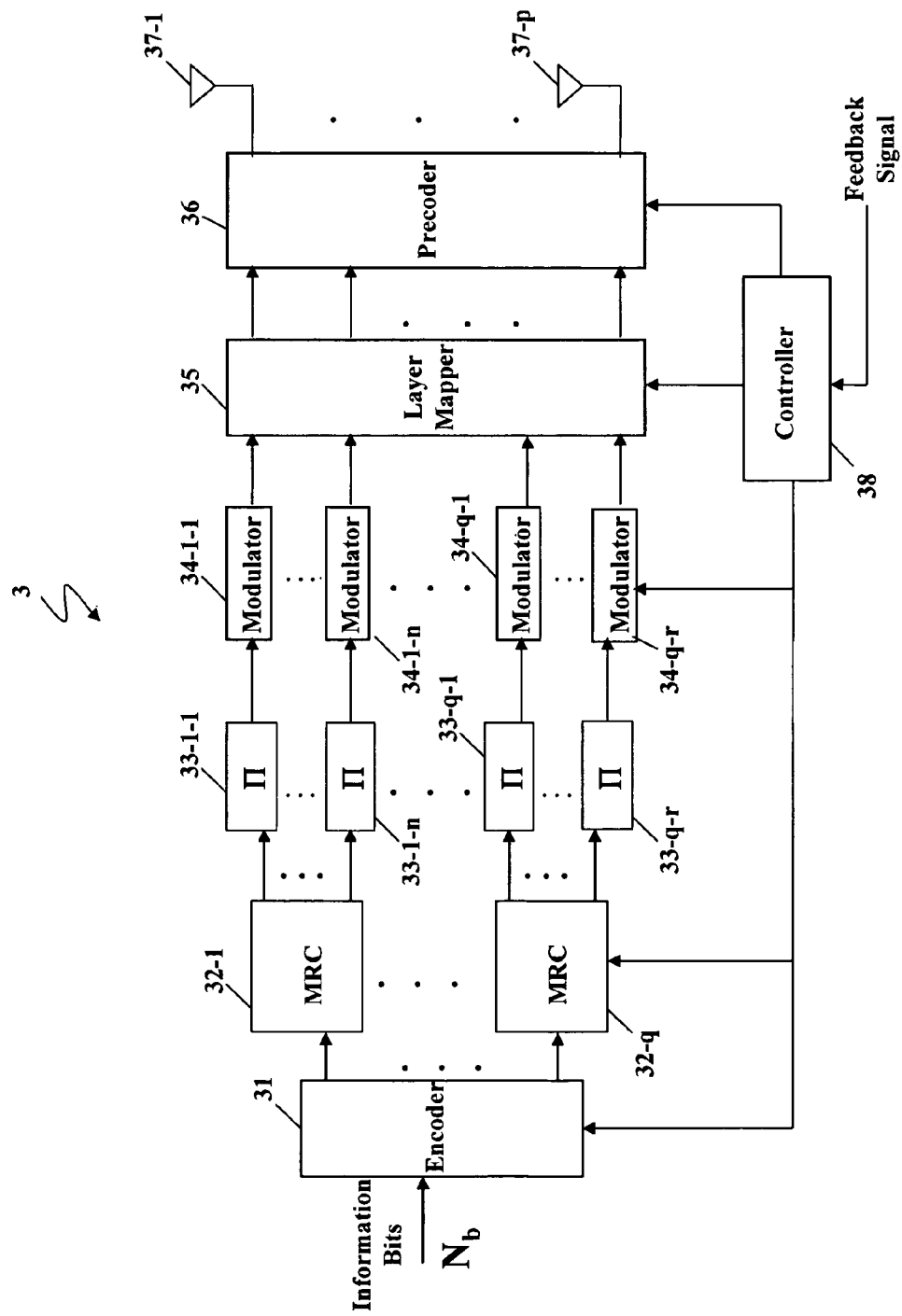
FIG. 3A is a schematic block diagram of a transmitter in a communication system in accordance with one example of the present invention.

FIG. 3A is a schematic block diagram of a transmitter 3 in a communication system in accordance with one example of the present invention. Referring to FIG. 3A, the transmitter 3 may comprise an encoder 31, a number of "q" multi-rate control (MRC) units 32-1 to 32-$q$, channel interleavers 33-1-1 to 33-$q$-$r$, modulators 34-1-1 to 34-$q$-$r$, a layer mapper 35, a precoder antennas 37-1 to 37-$p$ and a controller 38, wherein "q", "r" and "p" are positive integers. The encoder 31 may receive information bits and encode the received information bits with a coding scheme such as one of 1/3-rate Turbo coding (TC) with tail bit addition, convolutional code and low density parity check code (LDPC). Encoded information bits, i.e., coded bits, may be split into a number of "q" sets at a ratio and then transmitted to the MRC units 32-1 to 32-$q$. Given an amount of 3,000 coded bits and three (q=3) MRC units 32-1 to 32-3, the ratio in one example may be 1:1:1 such that MRC units 32-1 to 32-3 may each receive a set of 1,000 coded bits. In another example, the ratio may be 3:2:1 such that the MRC units 32-1 to 32-3 may receive a set of coded bits having a size of 1,500, 1,000 and 500 bits, respectively. The MRC units 32-1 to 32-$q$, coupled with the controller 38, may be configured to provide a flexible rate-matching through puncture or repetition operations at various code rates. The ratio and code rates may be determined by the controller 38 based on a feedback signal from a receiver corresponding to the transmitter 3. In one example according to the present invention, the transmitter 3 may send a pilot signal to a receiver, and the feedback signal from the receiver may contain real-time channel information and signal quality measured at the receiver. In another example, the feedback signal may include a pilot signal sent from the receiver to the transmitter 3. Each of the MRC units 32-1 to 32-$q$ may include a splitter and one or more rate matcher, which will be discussed in paragraphs below with reference to FIG. 4A. Furthermore, a set of channel interleavers may be coupled to each of the MRC units 32-1 to 32-$q$, depending on the number of groups split from the splitter in each of the MRC units 32-1 to 32-$q$. Taking the MRC 32-1 as an example, a set of channel interleavers 33-1-1 to 33-1-$n$ may be coupled thereto, n being a positive integer. Accordingly, the splitter in the MRC 32-1 may be configured to divide incoming coded bits into "n" groups.

The modulators 34-1-1 to 34-$q$-$r$, coupled to the controller 38, may be grouped in sets and each set of the modulators may correspond to one set of the channel interleavers. For example, a first set of modulators 34-1-1 to 34-1-$n$ may correspond to the first set of channel interleavers 33-1-1 to 33-1-$n$, which in turn may be coupled to the first MRC 32-1. In one example according to the present invention, the modulators may perform one of, for example, quadrature phase shift keying (QPSK), 16-quadrature amplitude modulation (16-QAM) and 64-QAM schemes for interleaved signals from the channel interleavers. The layer mapper 35 may demultiplex symbols from the modulators 34-1-1 to 34-$n$-$r$ into, for example, a number of "s" symbols, which in turn may then be precoded by the precoder 36 for transmission via one or more of the antennas 37-1 to 37-$p$, wherein "s" is a positive integer smaller than or equal to "p". Specifically, the value of "s" may be smaller than or equal to a minimum of "p" and "t", where "t" is the number of antennas at the receiver side. Furthermore, the number of the modulators 34-1-1 to 34-$q$-$r$ in total may also be smaller than or equal to a minimum of "p" and "t".

Figure 3B:
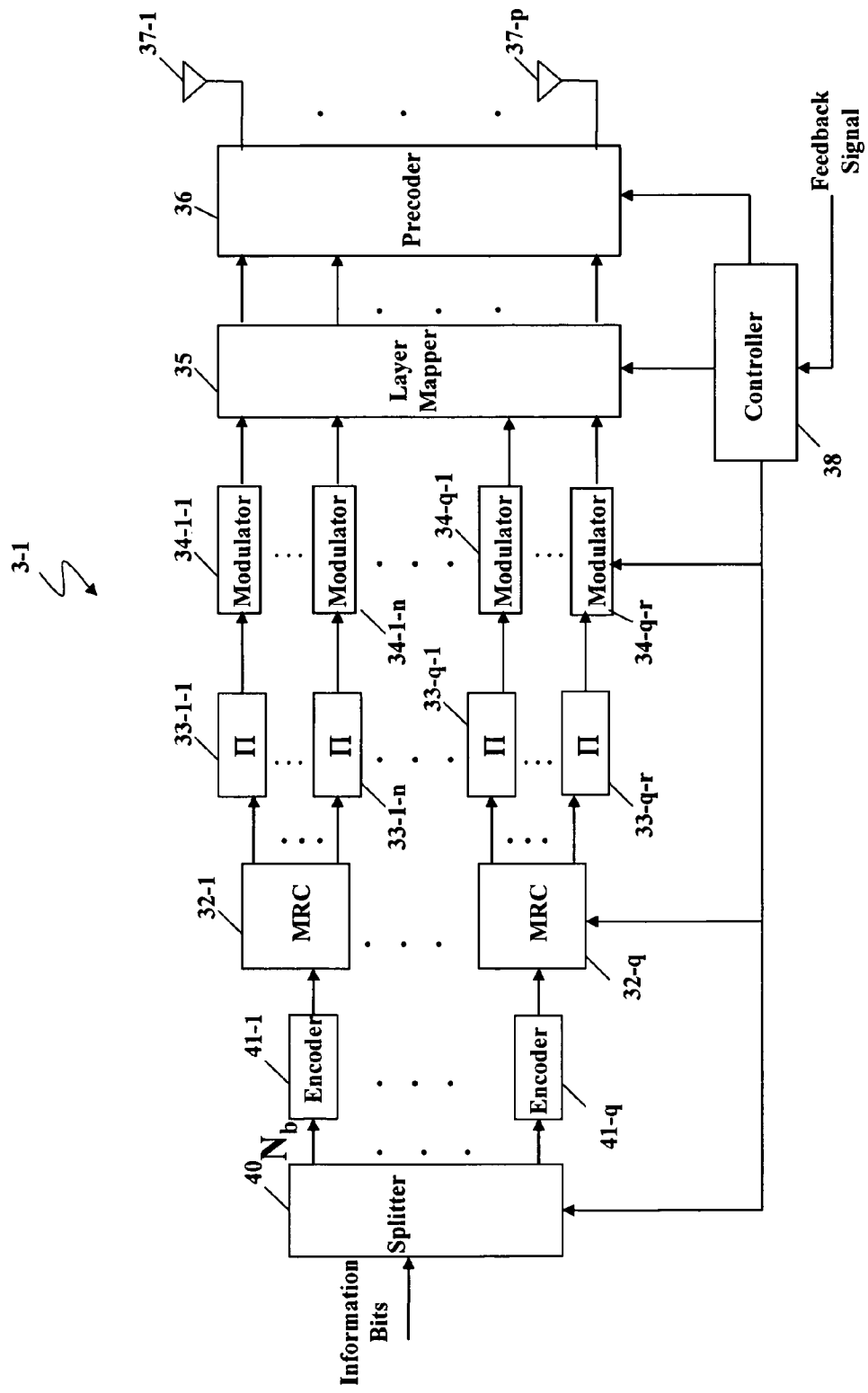
FIG. 3B is a schematic block diagram of a transmitter in a communication system in accordance with another example of the present invention.

FIG. 3B is a schematic block diagram of a transmitter 3-1 in a communication system in accordance with another example of the present invention. Referring to FIG. 3B, the transmitter 3-1 may be similar to the transmitter 3 described and illustrated with reference to FIG. 3A except that, for example, a splitter 40 and encoders 41-1 to 41-$q$ replace the encoder 31. The splitter 40 may be configured to split the information bits into a number of "q" groups, which in turn are received by the encoders 41-1 to 41-$q$, respectively. Furthermore, the encoders 41-1 to 41-$q$ may be coupled to the MRC units 32-1 to 32-$q$, respectively.

Figure 4A:
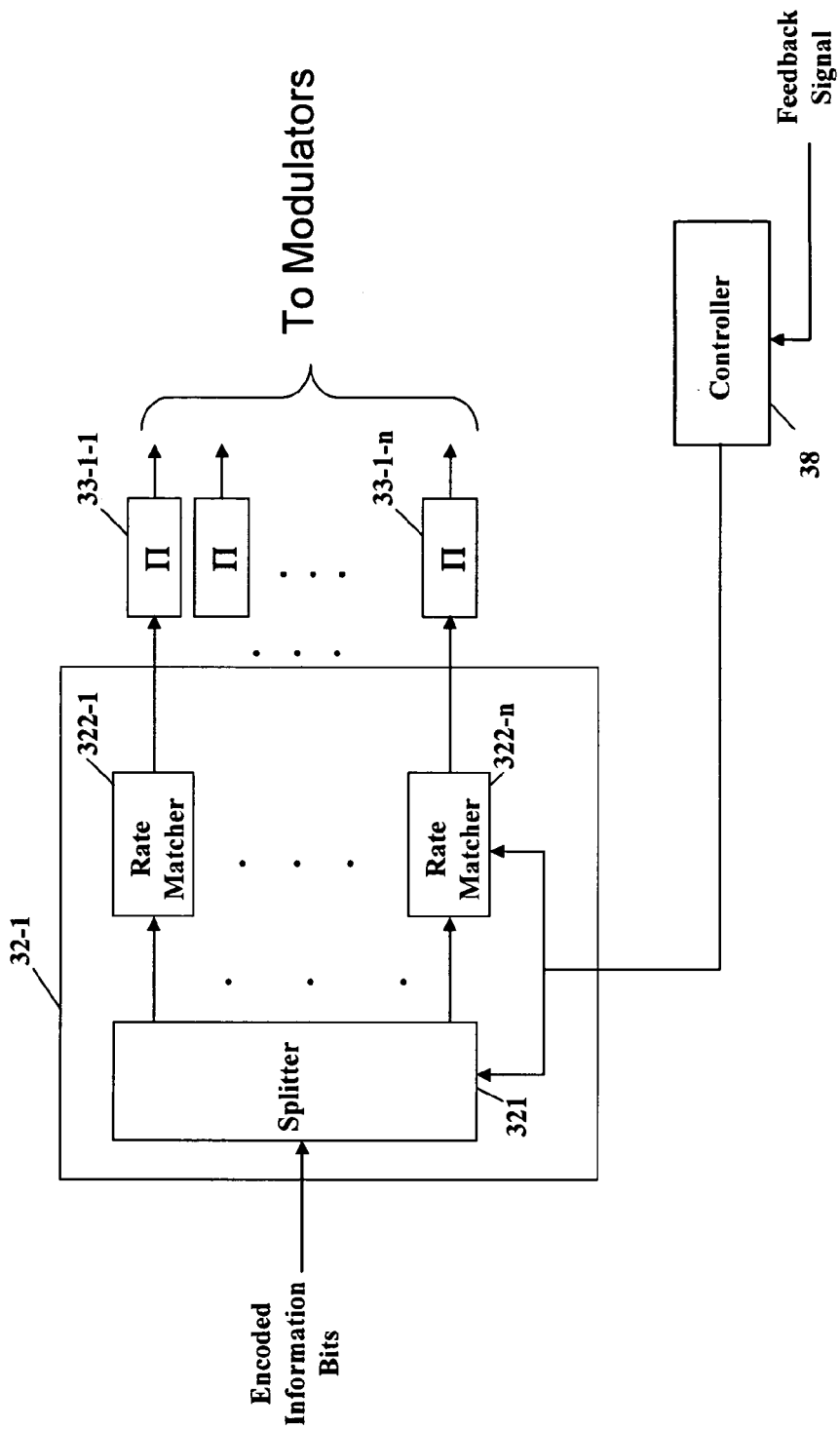
FIG. 4A is a schematic block diagram of an MRC unit illustrated in FIGS. 3A and 3B in accordance with one example of the present invention.

FIG. 4A is a schematic block diagram of an MRC unit 32-1 illustrated in FIGS. 3A and 3B in accordance with one example of the present invention. Referring to FIG. 4A, the MRC unit 32-1 may include a splitter 321 and rate matchers 322-1 to 322-$n$. The splitter 321 may split incoming encoded information bits into a number of "n" groups, which in turn may be respectively transmitted to the rate matchers 322-1 to 322-$n$. The controller 38 may be configured to control the splitter 321 to divide the encoded information bits into the "n" groups at different lengths or bit sizes based on the channel conditions contained in the feedback signal. In one example consistent with the present invention, the feedback signal may contain channel conditions in terms of signal-to-noise ratio (SNR), packet error rate and bit error rate. The controller 38 may control the rate matchers 322-1 to 322-$n$ to perform puncture or repetition operations at different code rates based on the channel conditions. In another example, the feedback signal may include a bit configured to indicate the controller 38 whether multi-rate control in the transmitter 3 is performed. In yet another example, the rate matchers 322-1 to 322-2 may be configured to adjust coded bits at a predetermined code rate, irregardless of whether a feedback signal is present. Furthermore, the splitter 321 may be configured to split the coded bits at a predetermined splitting rate, irregardless of whether a feedback signal is present.

Figure 4B:
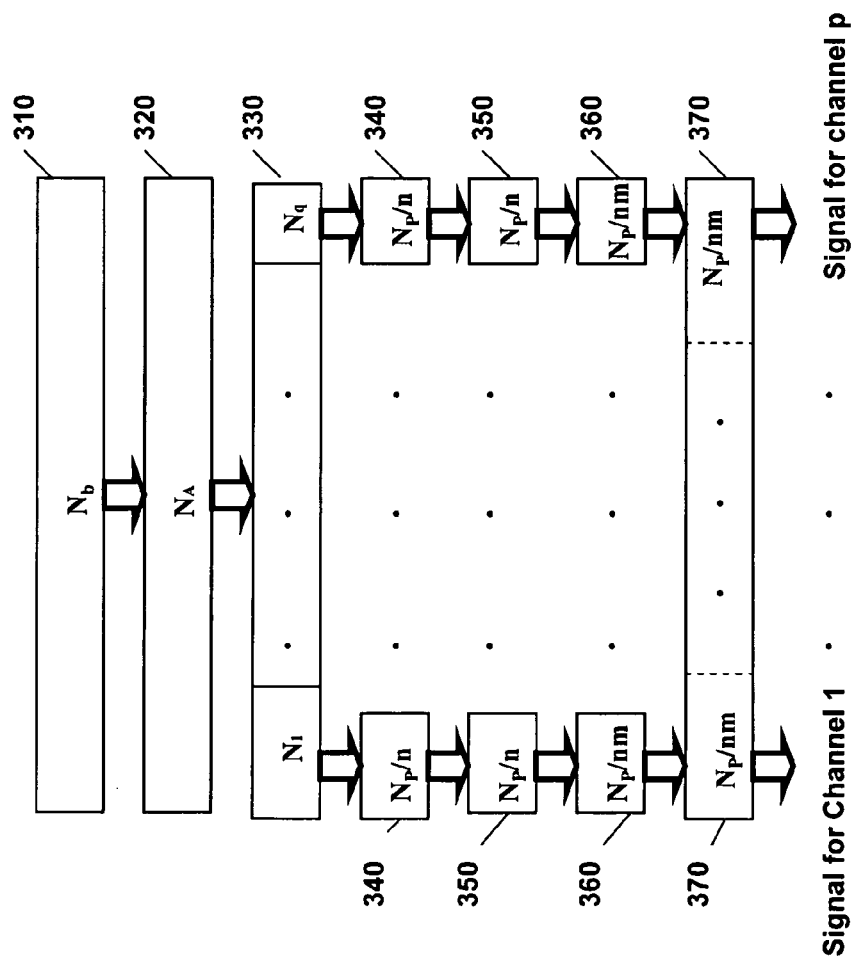
FIG. 4B is a flow diagram illustrating data processing in terms of bit size in a transmitter using the MRC unit illustrated in FIG. 4A.

FIG. 4B is a flow diagram illustrating data processing in terms of bit size in a transmitter using the MRC unit 32-1 illustrated in FIG. 4A. Referring to FIG. 4B and also FIG. 4A, at step 310, the encoder 31 (FIG. 3A) or a representative encoder 41-1 (FIG. 3B) may receive, for example, a number of "$N_b$" information bits. At step 320, the encoder 31 or 41-1 may encode the $N_b$ bits into a number of "$N_A$" coded bits, which in turn may be transmitted to the MRC units 32-1 to 32-n (FIG. 3A) or the MRC unit 32-1 (FIG. 3B). The value of "$N_A$" may equal ($3 N_b + 12$) if the 1/3 Turbo coding mechanism with 12 tail bits attachment is employed.

Next, at step 330, the MRC unit 32-1 may split the $N_A$ coded bits into "n" groups of coded bits, i.e. "$N_1$" to "$N_n$" groups. At step 340, the "$N_1$" to "$N_n$" groups of coded bits may be respectively transmitted to the rate matchers 322-1 to 322-n, where the controller 38 may assign different code rates thereto according to individual channel conditions based on the feedback signal. In the present example, the code rates for the rate matchers 322-1, 322-2 to 322-n are $N_1/(N_p/n)$, $N_2/(N_p/n)$ to $N_n/(N_p/n)$, respectively. Accordingly, the code rates may be different as the lengths of the "$N_1$" to "$N_n$" groups are different. Furthermore, the code rate $N_i/(N_p/n)$ may be greater than $N_n/(N_p/n)$ for i<n as the length of $N_i$ is greater than that of $N_n$, which may mean that the link condition of channel "i" is better than that of channel "n".

After rate matching, each of the rate matchers 322-1 to 322-n may generate a signal of "$N_p/n$" bits, where $N_p$ is the total amount of bits to be transmitted given the number of "$N_b$" information bits received at the encoder 31 or 41-1. At step 350, the signals of $N_p/n$ bits may be interleaved in the channel interleavers 33-1-1 to 33-1-n. At step 360, each of the modulators 34-1 to 34-1-n may modulate an interleaved signal of $N_p/n$ bits into a number of "$N_p/nm$" symbols, where the value of "m" depends on the modulation scheme adopted. For example, the value of "m" may equal 2, 4 and 6 for the QPSK, 16-QAM and 64-QAM schemes, respectively. At step 370, the modulated $N_p/nm$ symbols are de-multiplexed in the layer mapper 35 before precoded in the precoder 36 for transmission via one or more of the antennas 37-1 to 37-p corresponding to channels 1 to p.

Figure 5A:
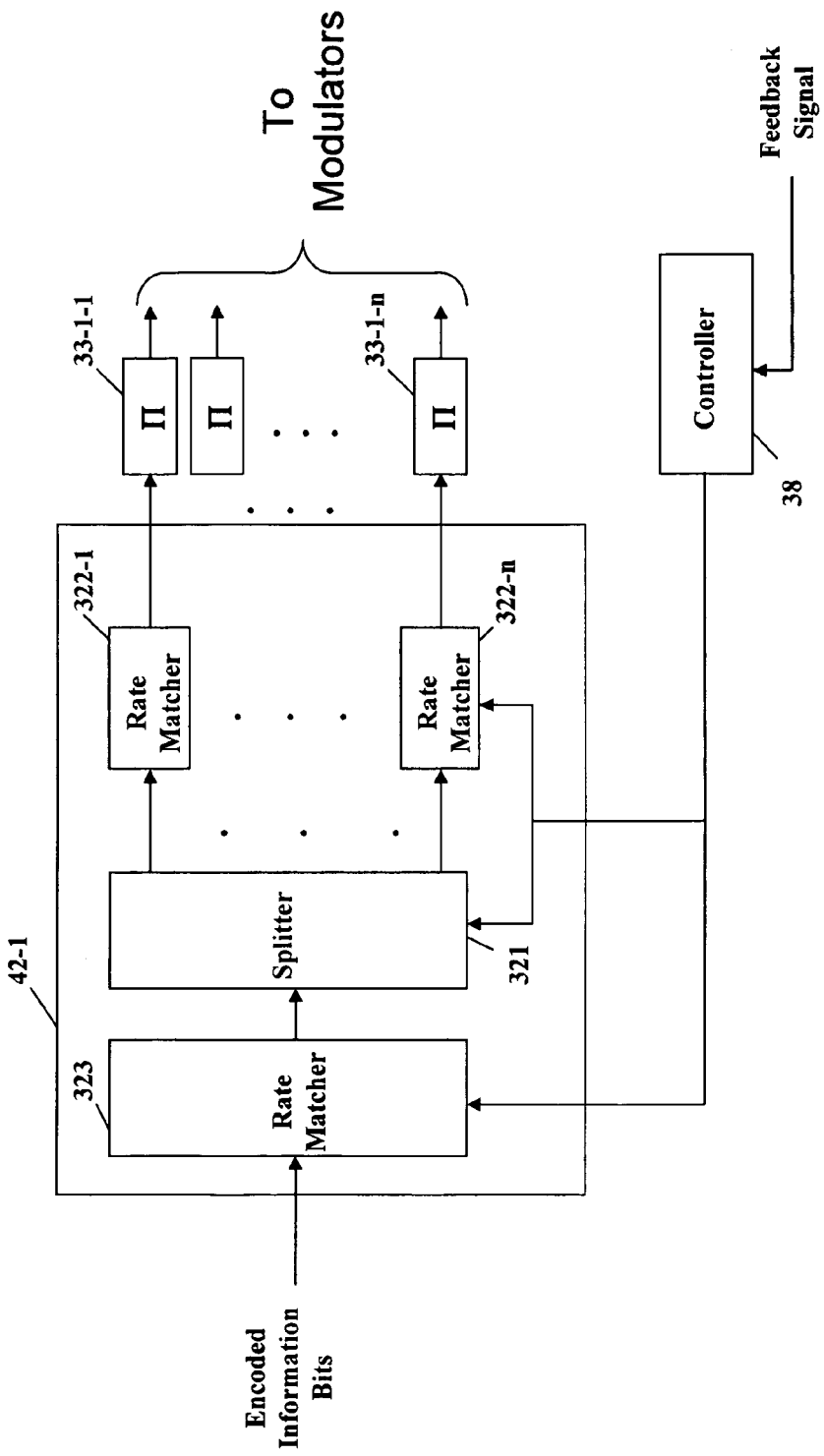
FIG. 5A is a schematic block diagram of an MRC unit in accordance with another example of the present invention.

FIG. 5A is a schematic block diagram of an MRC unit 42-1 in accordance with another example of the present invention. Referring to FIG. 5A, the MRC units 42-1 may be similar to the MRC unit 32-1 described and illustrated with reference to FIG. 4A except that, for example, an additional rate matcher 323 may be disposed in front of the splitter 321. The rate matcher 323 in one example may adjust coded bits at a code rate determined by the controller 38. The rate matcher 323 in another example may adjust the coded bits at a predetermined code rate.

Figure 5B:
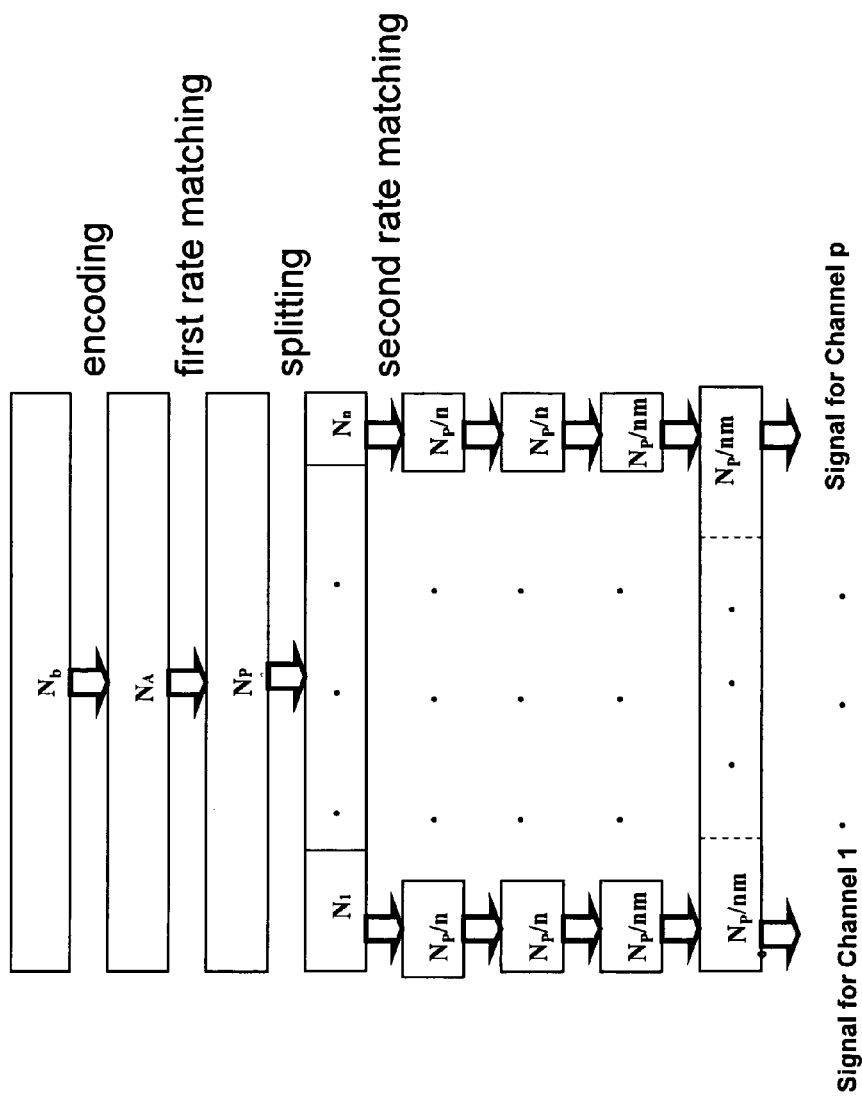
FIG. 5B is a flow diagram illustrating data processing in terms of bit size in a transmitter using the MRC unit illustrated in FIG. 5A.

FIG. 5B is a flow diagram illustrating data processing in terms of bit size in a transmitter using the MRC unit 42-1 illustrated in FIG. 5A Referring to FIG. 5B and also FIG. 5A, a number of "$N_b$" information bits may be encoded into a number of "$N_A$" coded bits. After a first rate matching at the rate matcher 323, data of a number of "$N_p$" bits may be provided, where $N_p$ is the total amount of bits to be transmitted given the number of "$N_b$" information bits at an encoder. Next, a splitting operation may be performed at the splitter 321, resulting in a number of "n" groups "$N_1$" to "$N_n$". A second rate matching may then be performed at the rate matchers 322-1 to 322-n for the groups "$N_1$" to "$N_n$", respectively. Subsequently, interleaving, modulation, layer mapping and antenna preceding may be performed, which may be similar to those described and illustrated with reference to FIG. 4B.

Figure 6A:
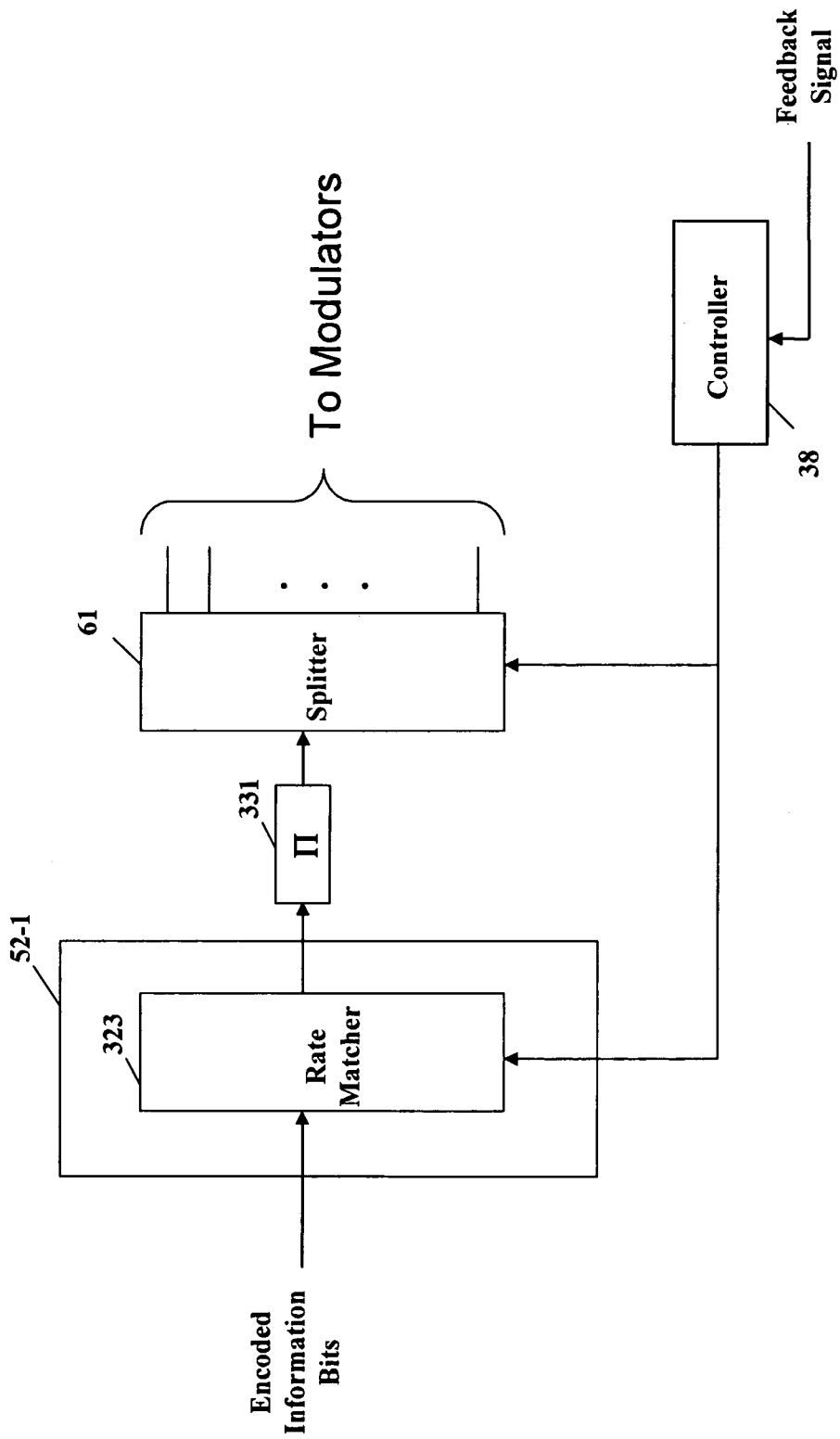
FIG. 6A is a schematic block diagram of an MRC unit in accordance with yet another example of the present invention.

FIG. 6A is a schematic block diagram of an MRC unit 52-1 in accordance with yet another example of the present invention. Referring to FIG. 6A, the MRC unit 52-1 may be similar to the MRC unit 42-1 described and illustrated with reference to FIG. 5A except that, for example, the splitter 321 and the rate matchers 322-1 to 322-n may be eliminated. Furthermore, the rate matcher 323 may be coupled to only one channel interleaver 331, which in turn may be coupled to a splitter 61.

Figure 6B:
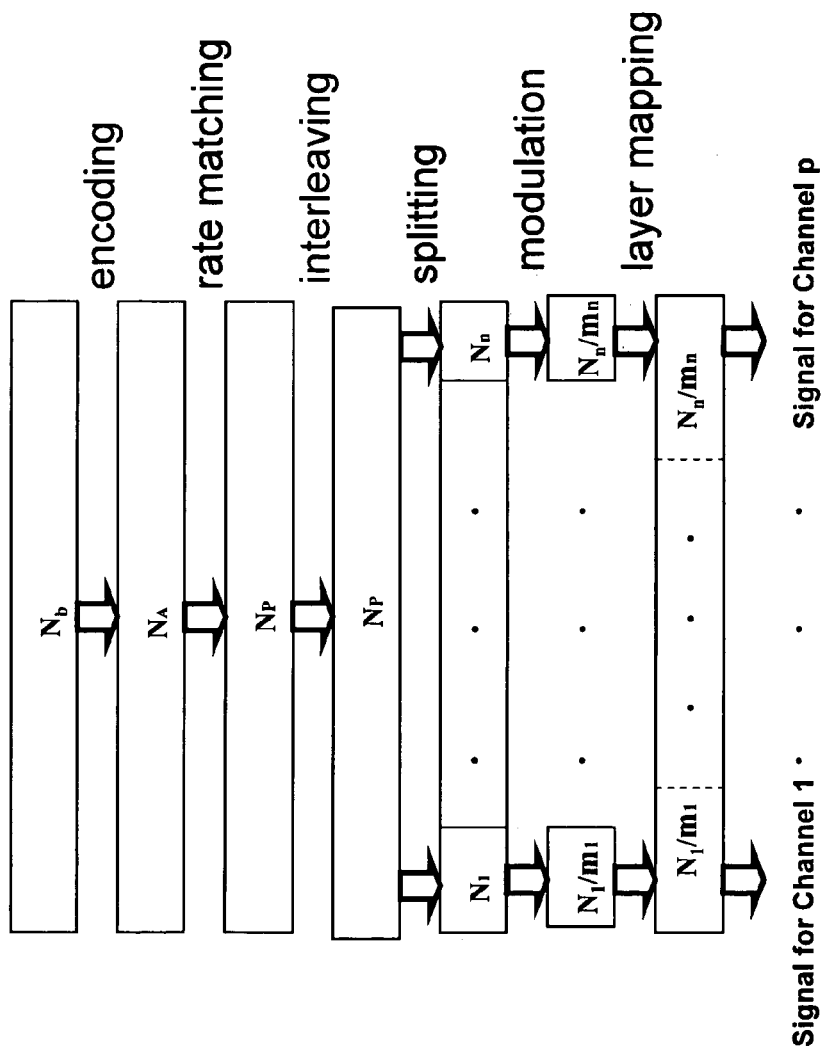
FIG. 6B is a flow diagram illustrating data processing in terms of bit size in a transmitter using the MRC unit illustrated in FIG. 6A.

FIG. 6B is a flow diagram illustrating data processing in terms of bit size in a transmitter using the MRC unit 52-1 illustrated in FIG. 6A. Referring to FIG. 6B and also FIG. 6A, a number of "$N_b$" information bits may be encoded into a number of "$N_A$" coded bits. A rate matching at the rate matcher 323 may puncture or repeat the number of "$N_A$" coded bits into a number of "$N_p$" coded bits, where $N_p$ is the total amount of bits to be transmitted given the number of "$N_b$" information bits at an encoder. Next, the number of "$N_p$" coded bits may be interleaved at the channel interleaver 331. A splitting operation may be performed at the splitter 61, resulting in a number of "n" groups of coded bits, i.e., "$N_1$" to "$N_n$" groups. Each of the "$N_1$" to "$N_n$" groups of coded bits may be modulated with a modulation scheme determined by the controller 38. The modulation scheme, represented by $m_1$ to $m_n$, may be different from group to group. Subsequently, layer mapping and antenna precoding may be performed in a fashion similar to those described and illustrated with reference to FIG. 4B.

Figure 7:
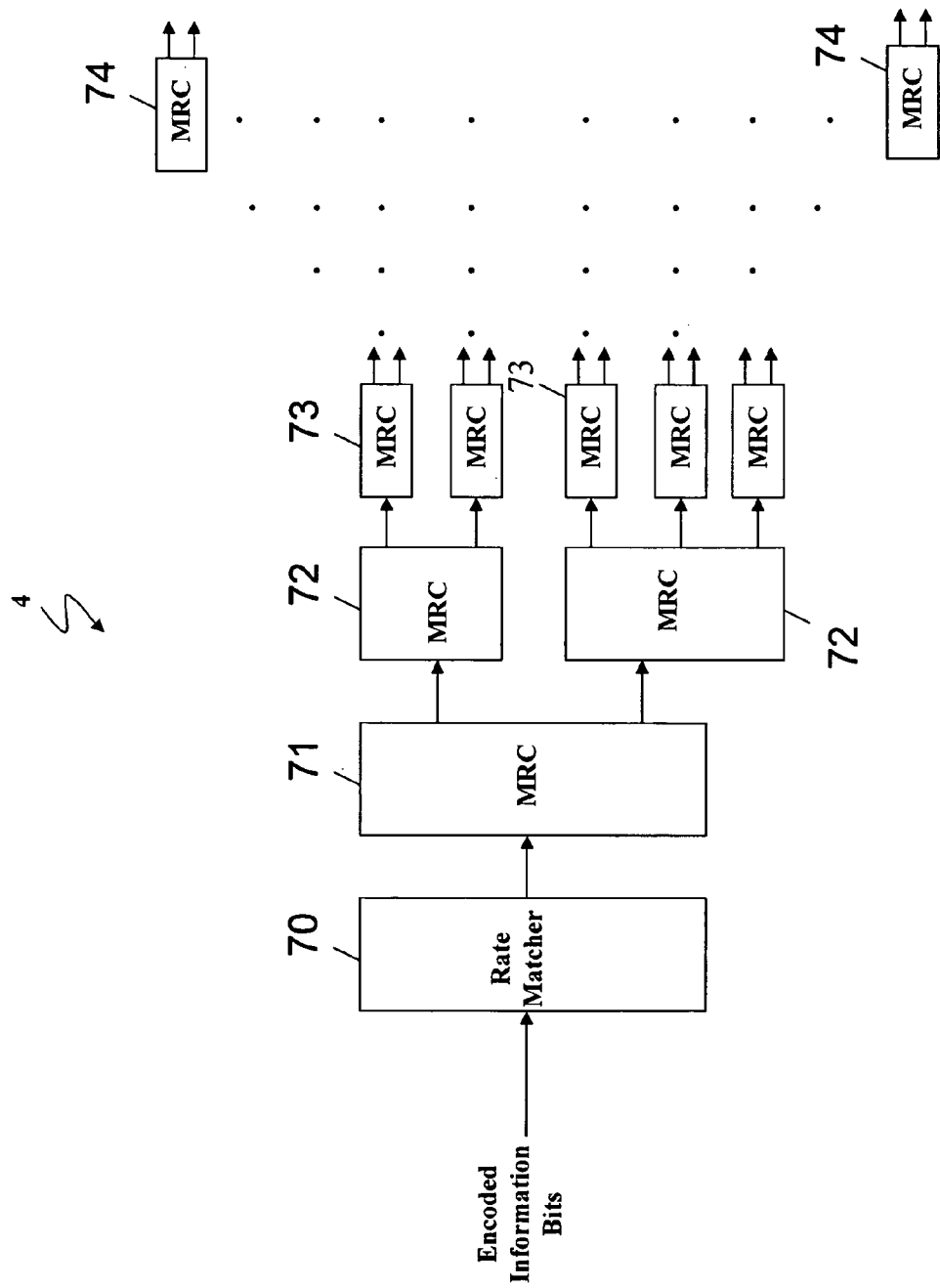
FIG. 7 is a schematic block diagram of a transmitter in a communication system in accordance with yet another example of the present invention

FIG. 7 is a schematic block diagram of a transmitter 4 in a communication system in accordance with yet another example of the present invention. Referring to FIG. 7, the transmitter 4 may comprise a rate matcher 70 and a plurality of MRC units 71 to 74 arranged in a hierarchical structure. The number of the MRC units 71 to 74 in one example may be dependent on the number of channels required for a MIMO system. Each of the MRC units 71 to 74 may include a splitter and one or more rate matcher. The splitter may split coded bits at a splitting ratio. Likewise, each of the one or more rate matcher may puncture or repeat coded bits at a code rate or puncturing/repetition ratio. The splitting ratio and the code rate in one example may be determined in accordance with channel conditions and may be adjusted in accordance with instantaneous channel information. To provide a flexible splitting and puncturing/repetition in order to maximize transmission capacities, channel conditions may be measured and analyzed at a receiver. Channel conditions may be expressed in a MIMO channel matrix H, which may be decomposed by singular value decomposition (SVD) given below.

$$H = U \Sigma V^H$$

Where U represents a left singular matrix and V represents a right singular matrix. Furthermore, $$\sum = \begin{bmatrix} D \\ O \end{bmatrix}, \text{if } M_t \geq M_r, \text{ or } \sum = [D \quad O], \text{if } M_t \geq M_r$$

$$D = \begin{bmatrix} \lambda_1 & & \\ & \ddots & \\ & & \lambda_v \\ \hline & 0 & \end{bmatrix}$$

Where $\lambda_1 \geq \ldots \geq \lambda_v$ and $v \leq \min\{M_t, M_r\}$, $\lambda$ being the singular values of the MIMO channel H and v being the rank of the channel. Furthermore, $M_t$ is the number of transmit antennas and $M_r$ is the number of receiver antennas.

Given the above, the code rates $R_1$ to $R_V$ for a MIMO system may be a function of the channel matrix H and in turn the function of the singular values $\lambda_1$ to $\lambda_V$, as given below.

$$(R_1 \ldots R_V) = f(H) = f(\lambda_1 \ldots \lambda_V) \quad \text{(Equation 1)}$$

For simplicity, assuming that the rank of channel (v), the number of mapped layers (L) and the number of precoded channels (Q) all equal 2, i.e., v=L=Q=2, based on the above Equation 1, we obtain $$(R_1, R_2) = f(\lambda_1, \lambda_2) \quad \text{(Equation 2)}$$

In one example, the code rates $R_1$ and $R_2$ for two channels may be positively proportional to corresponding singular values $\lambda_1$ and $\lambda_2$, as given below.

$$R_1 \lambda_2 = R_2 \lambda_1 \text{ or}$$
$$R_1 = \frac{\lambda_1}{\lambda_1 + \lambda_2}; R_2 = \frac{\lambda_2}{\lambda_1 + \lambda_2}$$

In another example, the code rates $R_1$ and $R_2$ may be positively proportional to the logarithmic values of corresponding singular values $\lambda_1$ and $\lambda_2$, which may be expressed below.

$$R_1 \log_n(\lambda_2) = R_2 \log_n(\lambda_1)$$
or
$$R_1 = \frac{\log_n(\lambda_1)}{\log_n(\lambda_1) + \log_n(\lambda_2)};$$
$$R_2 = \frac{\log_n(\lambda_2)}{\log_n(\lambda_1) + \log_n(\lambda_2)}, \text{ where } n > 1 \text{ and } n \in R$$

In still another example, the code rates $R_1$ and $R_2$ may be positively proportional to individual channel capacities $C_1$ and $C_2$ in terms of, for example, bits transmitted per Hertz (bits/Hz), which may be expressed below.

$$R_1 C_2 = R_2 C_1 \text{ or}$$
$$R_1 = \frac{C_1}{C_1 + C_2}; R_2 = \frac{C_2}{C_1 + C_2}$$

Figure 8A:
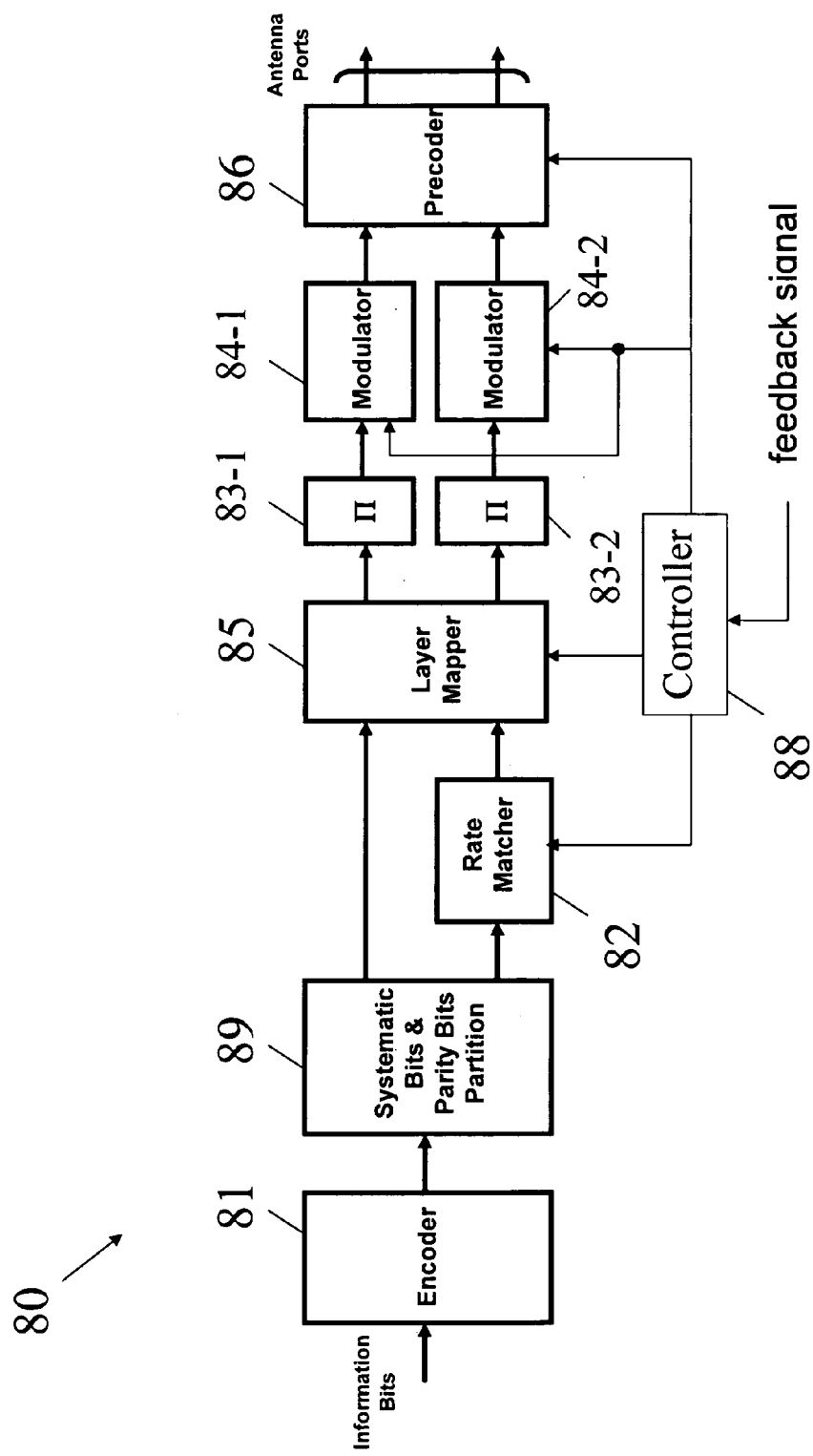
FIG. 8A is a schematic block diagram of a transmitter for data processing in a multi-channel communication system in accordance with an example of the present invention.

FIG. 8A is a schematic block diagram of a transmitter 80 for data processing in a multi-channel communication system in accordance with an example of the present invention. Referring to FIG. 8A, the transmitter 80 may include an encoder 81, a partitioning device 89, a rate matcher 82, a layer mapper 85, interleavers 83-1 and 83-2, modulators 84-1 and 84-2 and a precoder 86. The partitioning device 89 may be configured to separate coded bits from the encoder 81 by their degree of importance in data communication. For example, the partitioning device 89 may form at least a first group of coded bits and a second group of coded bits out of the coded bits from the encoder 81, given a simple two-antenna system for the purpose of illustration. The first group of coded bits may be considered more important than the second group of coded bits in data communication because the loss of bits of the first group during transmission may cause a more severe bit error rate or block error rate than the loss of bits of the second group. The second group of coded bits in one example may be punctured by the rate matcher 82 at a puncture rate identified by a controller 88 in accordance with the information on channel condition contained in a feedback signal. In another example, the second group of coded bits may be punctured by the rate matcher 82 at a predetermined puncture rate. The layer mapper 85 may be configured to map the first group for a first channel and the punctured second group for a second channel, where the first channel has a better channel condition than the second channel. The first group may then be interleaved at the interleaver 83-1, modulated at the modulator 84-1 and precoded at the precoder 86 before transmitted via, for example, a first antenna. Similarly, the punctured second group may be interleaved at the interleaver 83-2, modulated at the modulator 84-2 and precoded at the precoder 86 before transmitted via, for example, a second antenna.

Skilled persons in the art will understand that the transmitter 80 may be configured to transmit important bits through one or more better channel and less important bits through other channels when the number of channels is equal to or greater than three.

Figure 8B:
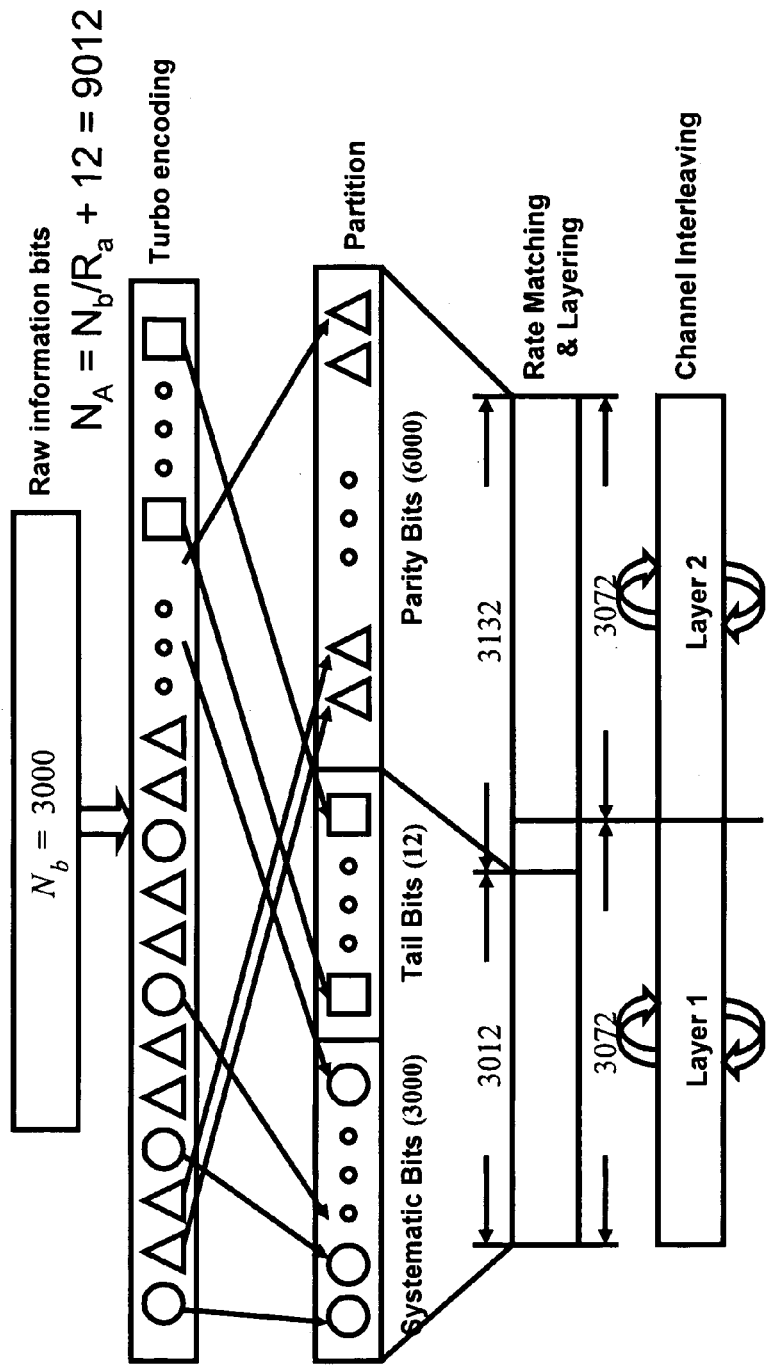
FIGS. 8B to 8E are flow diagrams illustrating data processing in terms of bit size in the transmitter illustrated in FIG. 8A in accordance with examples of the present invention.

FIGS. 8B to 8E are flow diagrams illustrating data processing in terms of bit size in the transmitter 80 illustrated in FIG. 8A in accordance with examples of the present invention. Referring to FIGS. 8B and also 8A, a number of information bits may be encoded by the encoder 81 into coded bit. For example, a number of 3,000 information bits are coded into 9,012 coded bits, given a 1/3 turbo coding scheme with 12 tail bits attachment. In the present example, systematic bits, represented by circles and having a size of, for example, 3,000 bits, are considered more important than parity bits, represented by triangles and having a size of, for example, 6,000 bits. The system bits and the parity bits may be arranged in a pattern after the encoding process. For example, one system bit may be followed by two parity bits. In accordance with the pattern, the partitioning device 89 may form a first group of bits comprising the systematic bits and a second group of bits comprising the parity bits. In the present example, the tail bits, represented by squares, are classified into the first group. The second group of bits may be punctured at a rate identified by the controller 88 in accordance with the channel condition of, for example, a second channel. The first group of bits may be subsequently processed by the interleaver 83-1, modulator 84-1 and precoder 86 before transmitted via a first channel having a better channel condition than the second channel, while the punctured second group of bits may be subsequently processed by the interleaver 83-2, modulator 84-2 and precoder 86 before transmitted via the second channel.

Figure 8C:
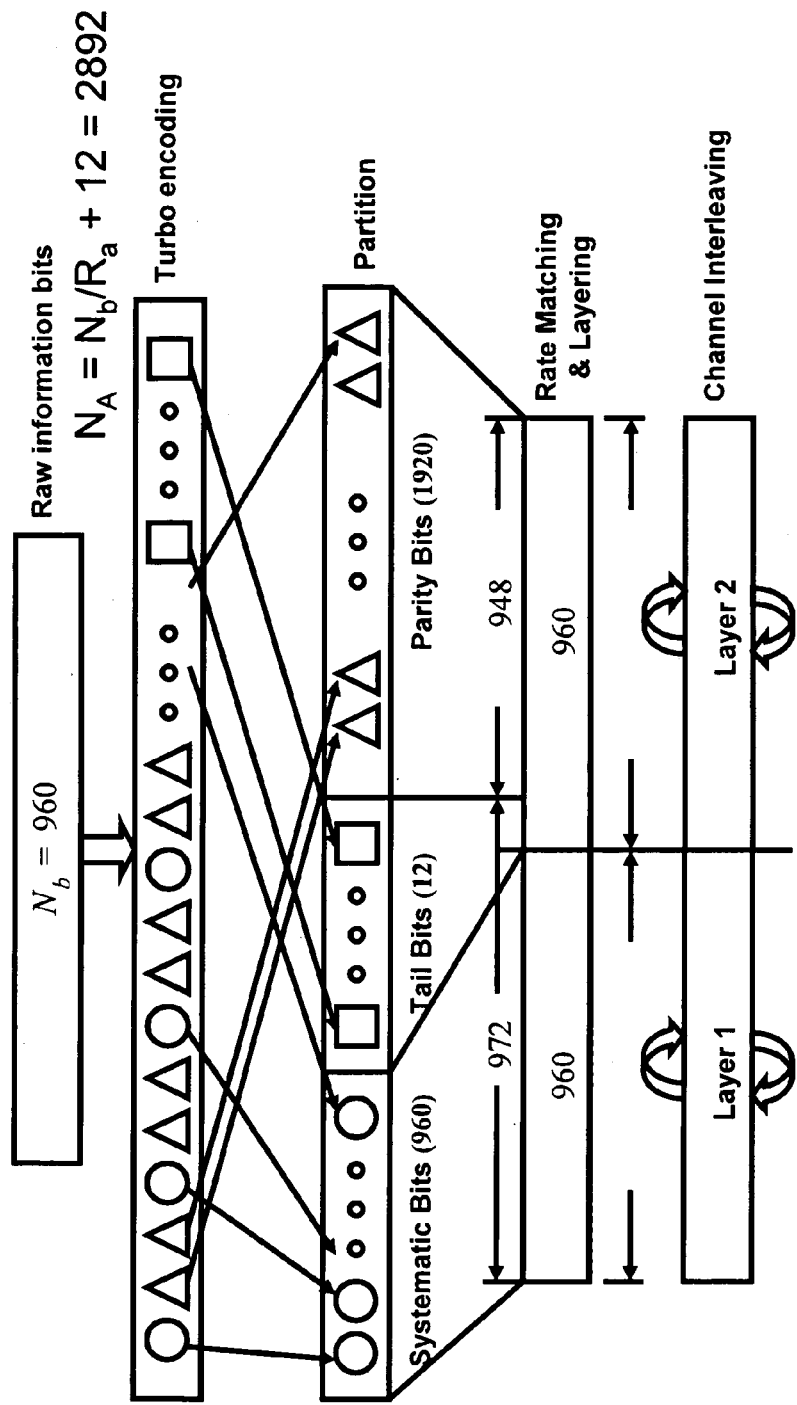

Referring to FIG. 8C, the data processing illustrated in FIG. 8C may be similar to that described and illustrated with reference to FIG. 8B except that, for example, the size of information bits is 960 instead of 3,000 and the tail bits are classified into the second group. The code rate in the example illustrated in FIG. 8B is approximately 1/2 and the code rate in the present example is 1/2. In other examples, however, code rates may be greater or smaller than 1/2, as will be discussed below.

Figure 8D:
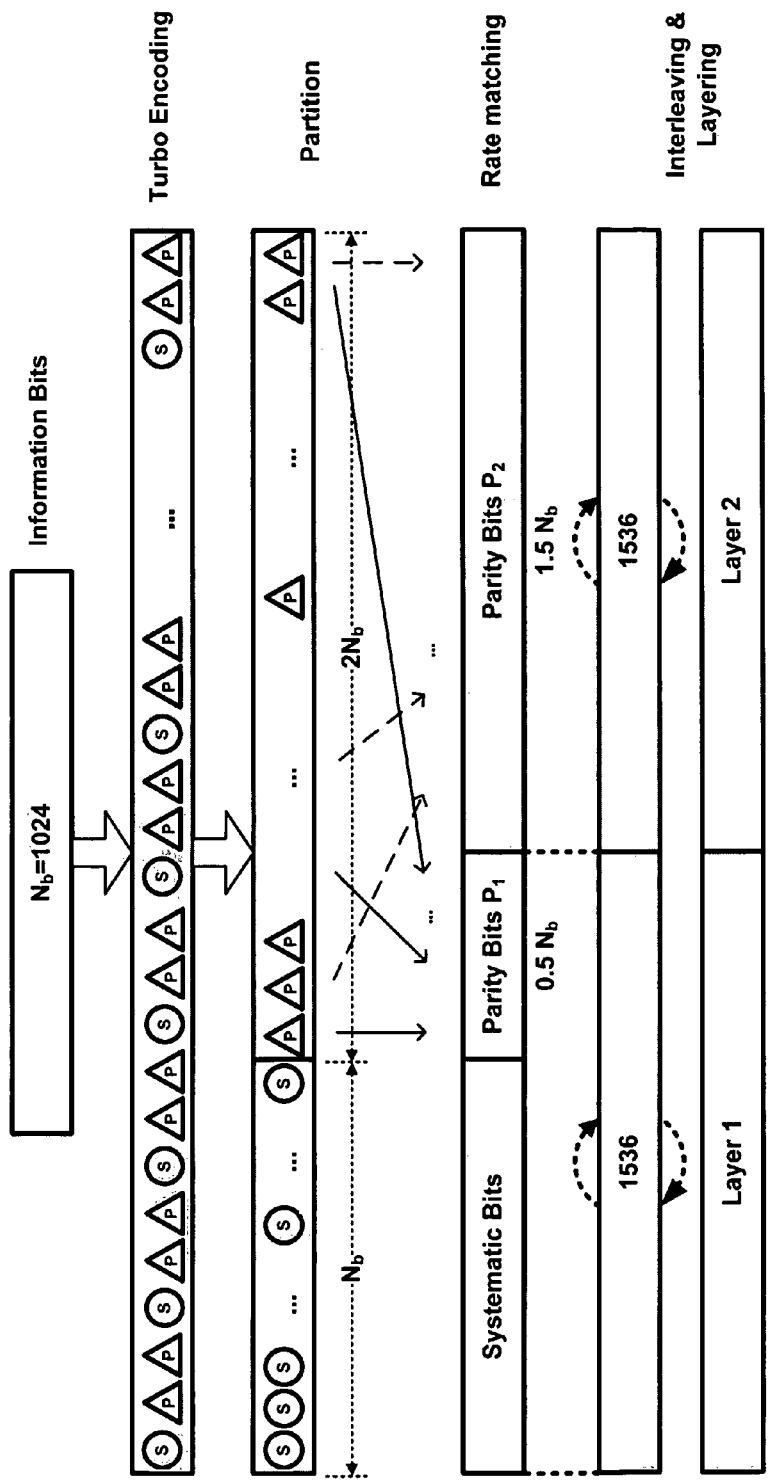

Referring to FIG. 8D, a number of "$N_b$" information bits are received by the encoder 81. A code rate of 1/3 may be determined by the controller 88. Based on the code rate, the length (1.5 $N_b$) of each of a first layer (layer 1) and a second layer (layer 2) of the layer mapper 85 for data transmission via the first channel and the second channel, respectively, may be identified. After the 1/3-rate Turbo coding, the coded bits have a size of 3 $N_b$ bits, wherein one systematic bit "S" may be followed by two parity bits "P's". The coded bits may be partitioned into a first group of bits composed of the systematic bits and a second group of bits composed of the parity bits in the partitioning device 89. The first group of bits may have a size of $N_b$ while the second group of bits may have a size of 2 $N_b$. Given the code rate of 1/3, a portion of the parity bits may be allocated to the layer 1. In the present example, a quarter of the parity bits may be allocated to the layer 1. The rate matcher 82 may be configured to select a quarter of bits from the parity bits in a periodic manner. That is, every other four parity bits may be selected. Accordingly, the systematic bits and the selected bits $P_1$ may be allocated to the layer 1, and the unselected parity bits $P_2$ may be allocated to the layer 2.

Figure 8E:
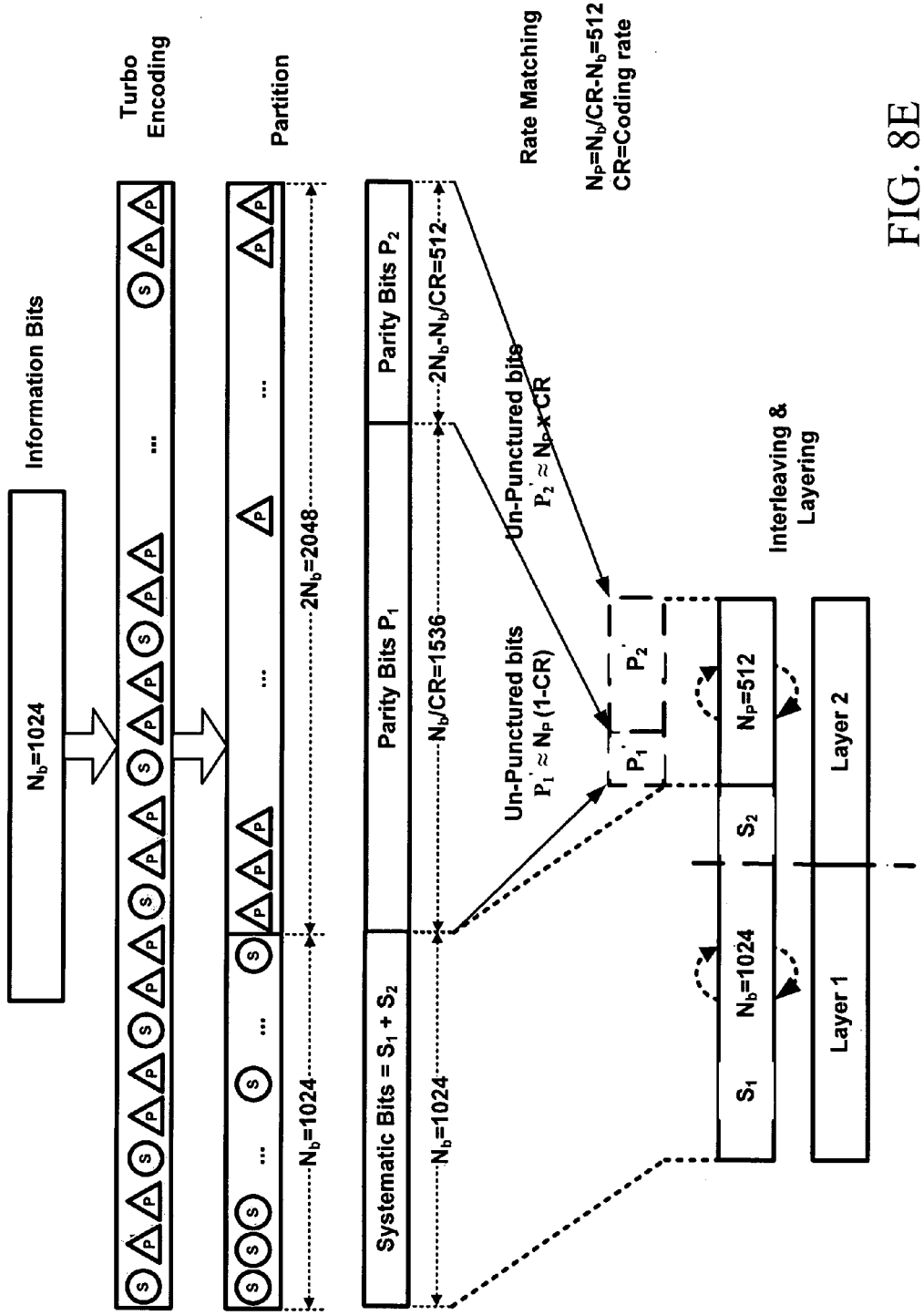

Referring to FIG. 8E, the data processing may be similar to that in FIG. 8D except that, for example, a code rate (CR) of 2/3 may be determined by the controller 88. Based on the code rate, the length (0.75 $N_b$) of each of layer 1 and layer 2 for data transmission via the first channel and the second channel, respectively, may be identified. The systematic bits may include a first set $S_1$ and a second set $S_2$, and the parity bits may include a first set $P_1$ related to $S_1$ and a second set $P_2$ related to $S_2$. The first set $S_1$ and the second set $S_2$ of the systematic bits may be respectively allocated to the layer 1 and the layer 2, and in turn may be respectively transmitted via the first channel and the second channel. Furthermore, the size each of systematic bits and parity bits in the layer 2 may also be identified. For example, the size ($N_p$) of the parity bits in the layer 2 may equal ($N_b$/CR)−$N_b$=0.5 $N_b$, and the size of $S_2$, the systematic bits in the layer 2, may equal 0.75 $N_b$−0.5 $N_b$=0.25 $N_b$. Since $S_1$ (0.75 $N_b$) is three times the size of and $S_2$ (0.25 $N_b$), $P_1$ (1.5 $N_b$) is also three times the size of and $P_2$ (0.5 $N_b$).

Calculating the sizes of $N_p$ and $S_2$ may facilitate to calculate the puncturing rates of $P_1$ and $P_2$. In the present example, $P_1$ may be more punctured than $P_2$ because the first channel via which $S_1$ is to be transmitted is better than the second channel via which $S_2$ is to be transmitted. In one example according to the present invention, the ratio of un-punctured $P_1$ to un-punctured $P_2$ may be 1:3, which is the same ratio of the size of $S_2$ to the size of $S_1$. Accordingly, in the $N_p$ of 0.5 $N_b$, the sizes of un-punctured $P_1$ and un-punctured $P_2$ are 0.125 $N_b$ and 0.375 $N_b$, respectively.

Figure 9A:
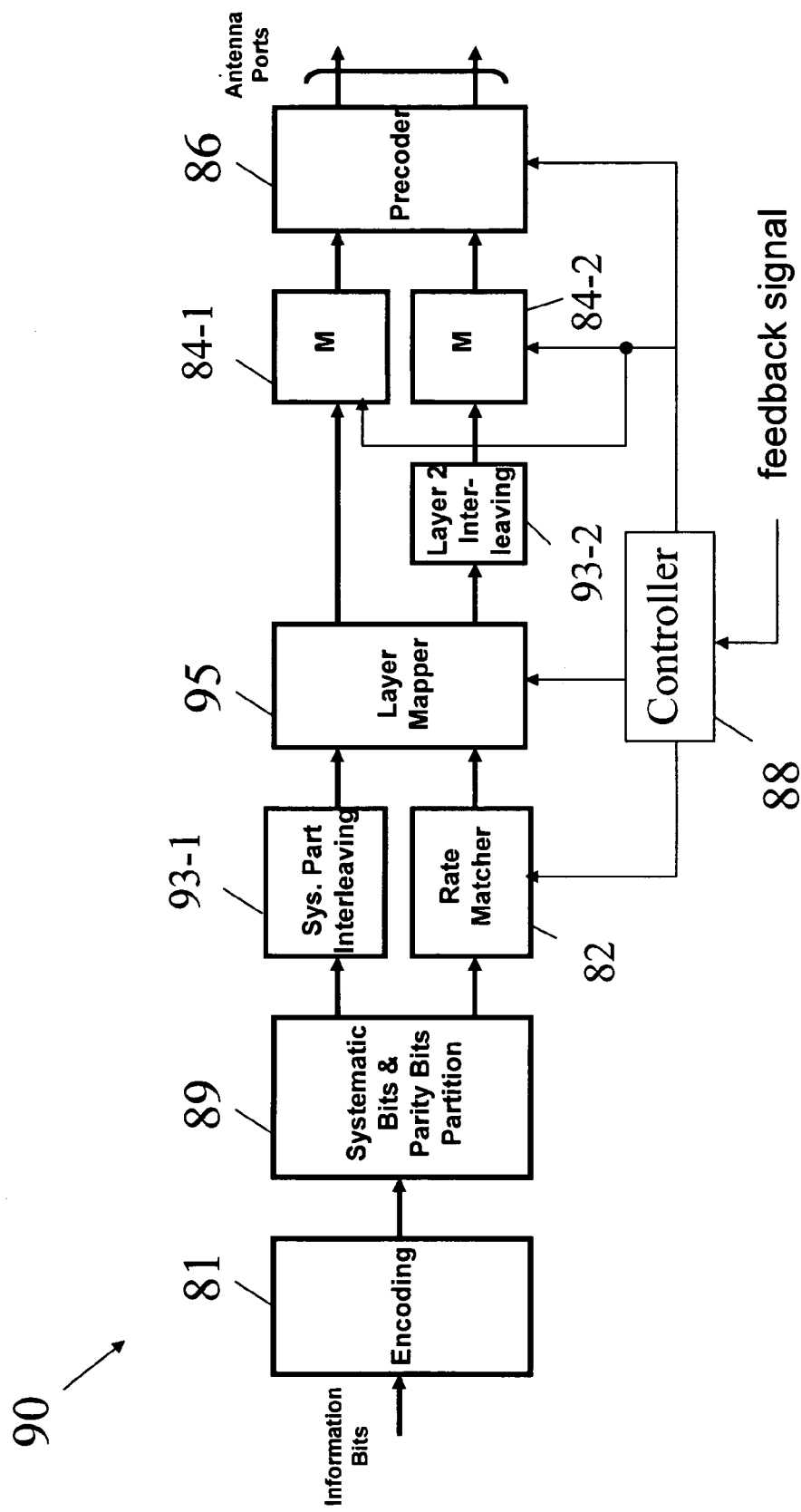
FIG. 9A is a schematic block diagram of a transmitter for data processing in a multi-channel communication system in accordance with another example of the present invention.
Figure 9B:
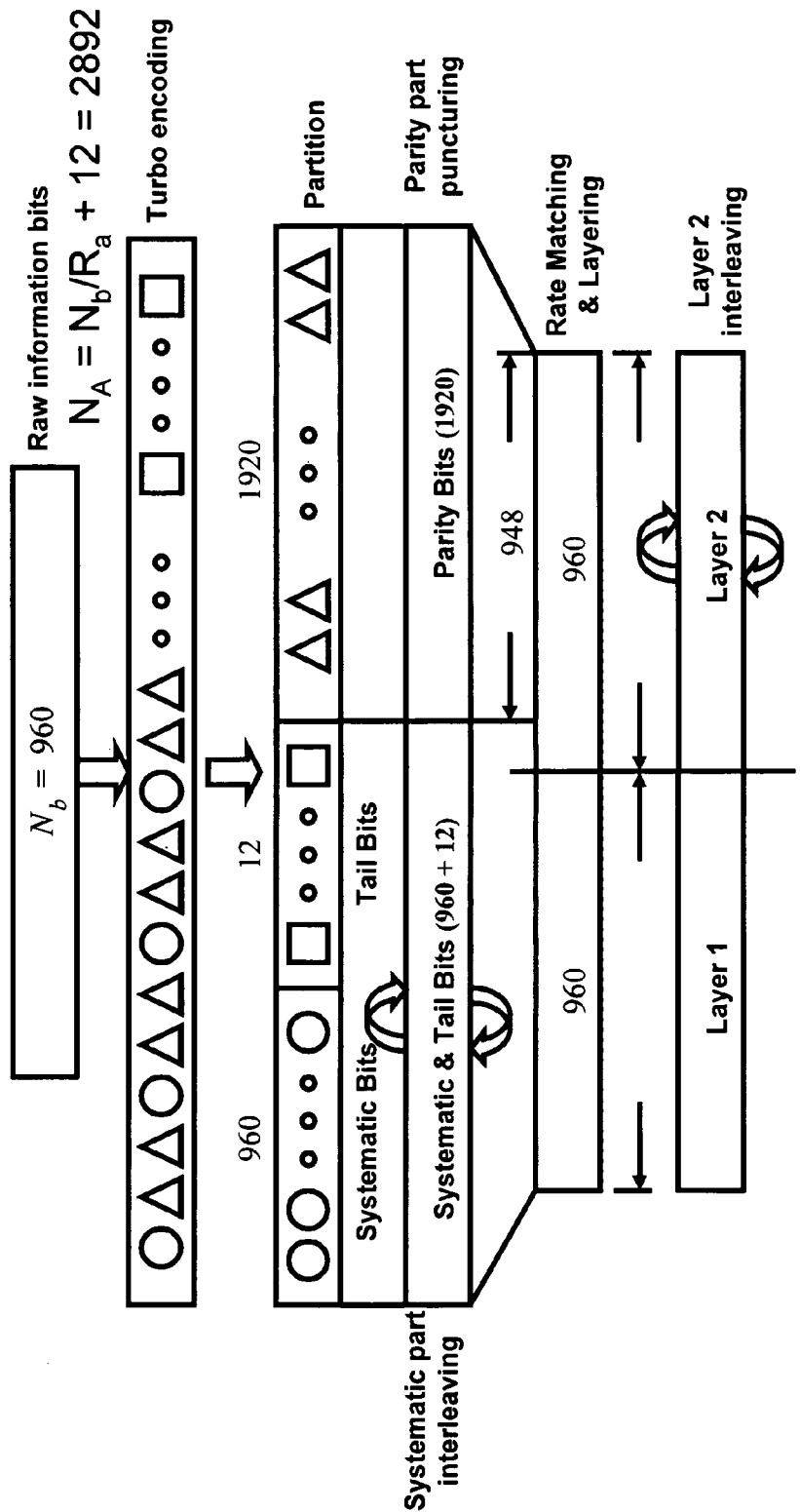
FIG. 9B is a flow diagram illustrating data processing in terms of bit size in the transmitter illustrated in FIG. 9A in accordance with an example of the present invention.

FIG. 9A is a schematic block diagram of a transmitter 90 for data processing in a multi-channel communication system in accordance with another example of the present invention. Referring to FIG. 9A, the transmitter 90 may be similar to the transmitter 80 described and illustrated with reference to FIG. 8A except that, for example, interleavers 93-1 and 93-2 replace the interleavers 83-1 and 83-2. The first group of bits may be interleaved at the interleaver 93-1 before they are sent to a layer mapper 95. The layer mapper 95 may map the first group of bits for a first channel and the punctured second group of bits for a second channel. The punctured second group of bits are interleaved at the interleaver 93-2 before they are modulated at the modulator 84-2. The data processing in terms of bit size in the transmitter 90 described and illustrated with reference to FIG. 9A is illustrated in FIG. 9B.

Figure 10A:
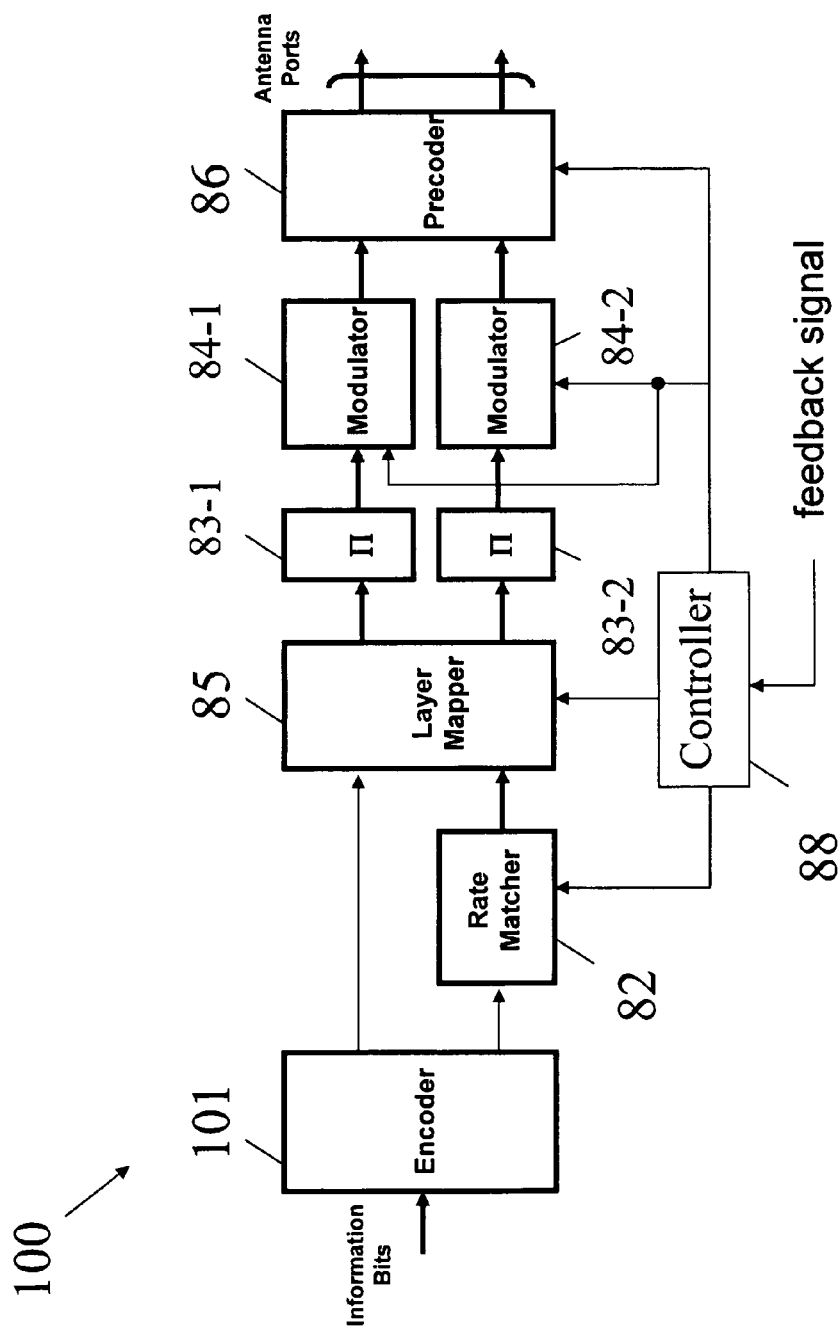
FIG. 10A is a schematic block diagram of a transmitter for data processing in a multi-channel communication system in accordance with yet another example of the present invention.
Figure 10B:
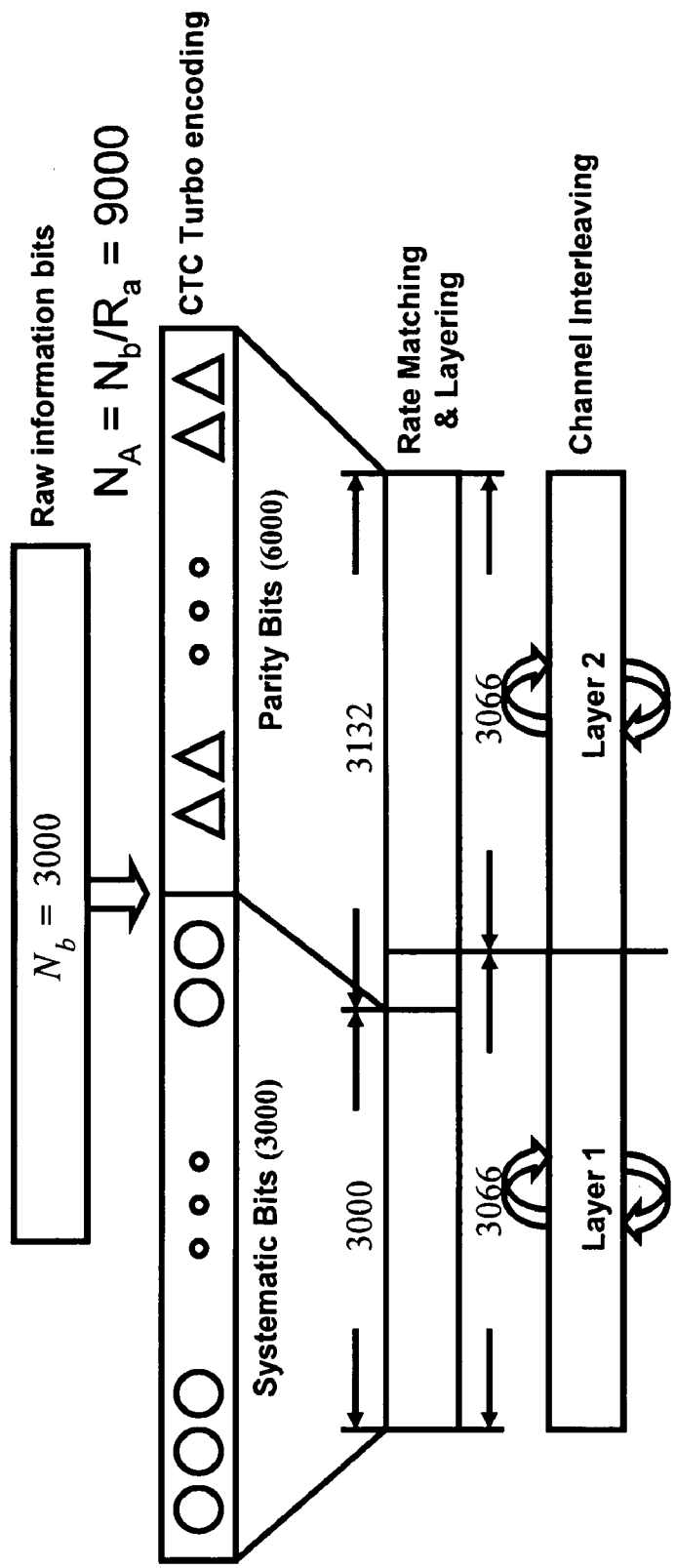
FIG. 10B is a flow diagram illustrating data processing in terms of bit size in the transmitter illustrated in FIG. 10A in accordance with an example of the present invention.

FIG. 10A is a schematic block diagram of a transmitter 100 for data processing in a multi-channel communication system in accordance with yet another example of the present invention. Referring to FIG. 10A, the transmitter 100 may be similar to the transmitter 80 described and illustrated with reference to FIG. 8A except that, for example, an encoder 101 replaces the encoder 81 and the partitioning device 89 is eliminated. The encoder 101 may be configured to encode information bits based on a convolutional turbo code (CTC) scheme, which may arrange coded bits in a pattern that systematic bits are separated from parity bits. Consequently, no partitioning device is required to form the systematic bits and parity bits in separate groups. The data processing in terms of bit size in the transmitter 100 illustrated in FIG. 10A is illustrated in FIG. 10B.

Figure 11A:
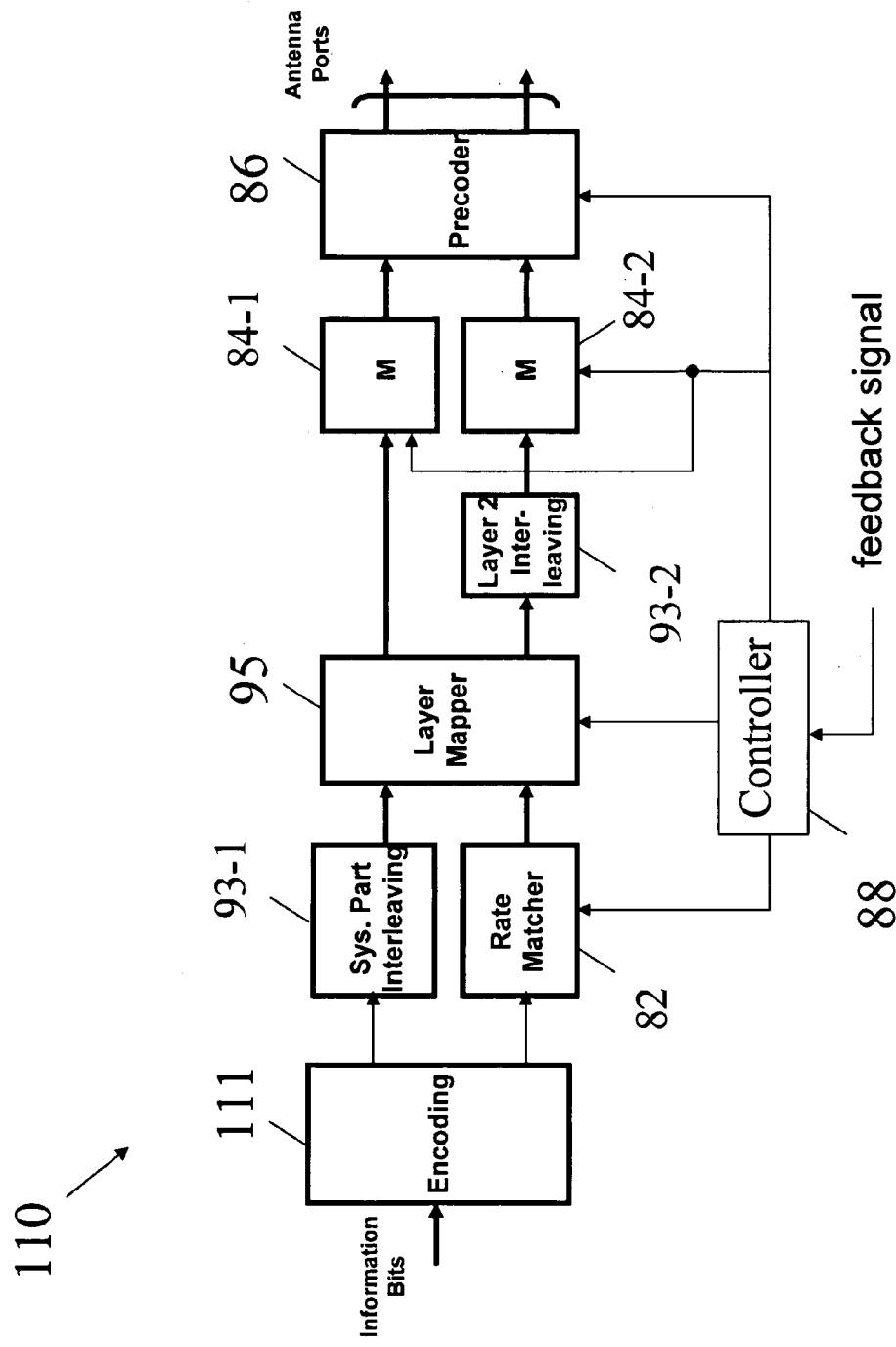
FIG. 11A is a schematic block diagram of a transmitter for data processing in a multi-channel communication system in accordance with still another example of the present invention.
Figure 11B:
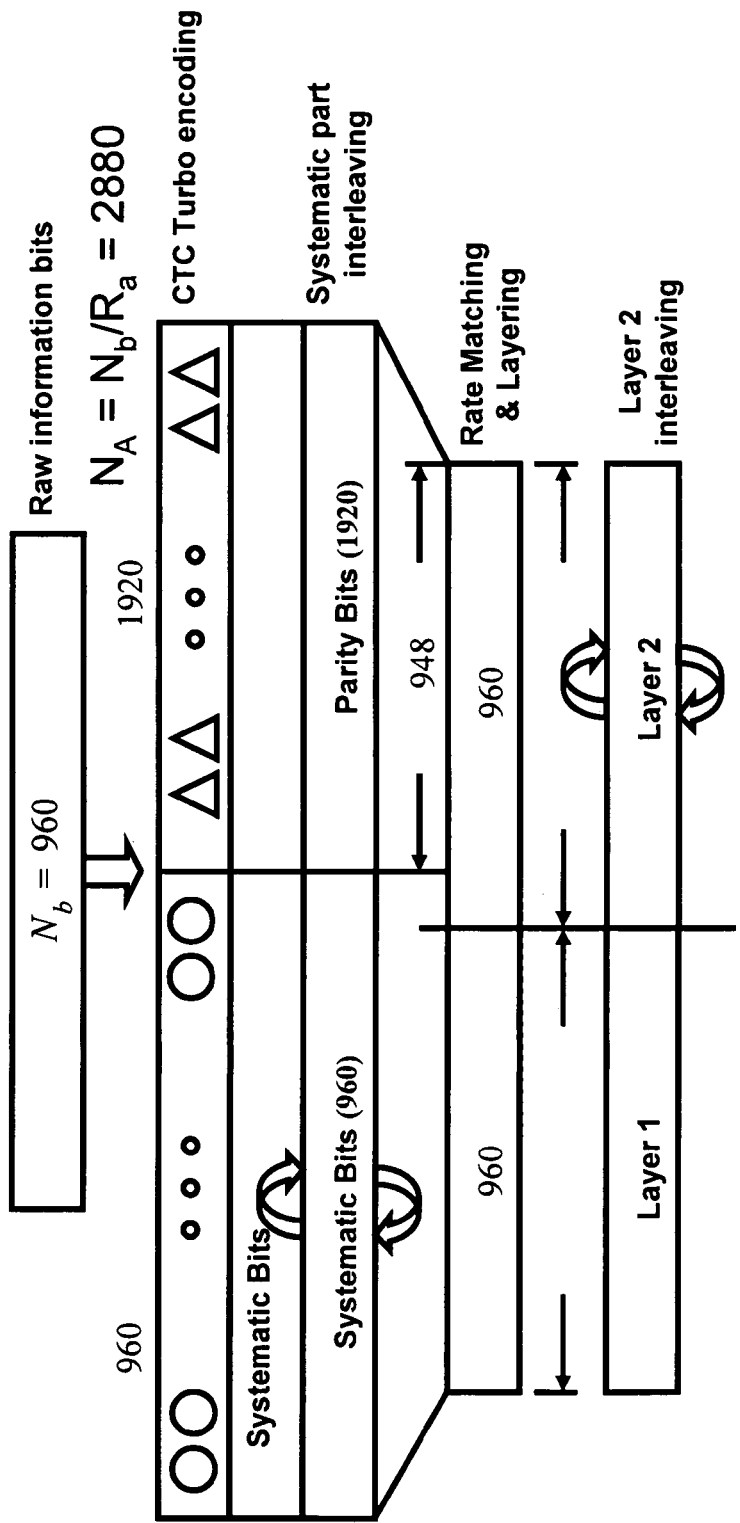
FIG. 11B is a flow diagram illustrating data processing in terms of bit size in the transmitter illustrated in FIG. 11A in accordance with an example of the present invention.

FIG. 11A is a schematic block diagram of a transmitter 110 for data processing in a multi-channel communication system in accordance with still another example of the present invention. Referring to FIG. 11A, the transmitter 110 may be similar to the transmitter 90 described and illustrated with reference to FIG. 9A except that, for example, an encoder 111 replaces the encoder 81 and the partitioning device 89 is eliminated. The encoder 111 may be configured to encode information bits based on the convolutional turbo code (CTC) scheme, which may arrange coded bits in a pattern that systematic bits are separated from parity bits. Consequently, no partitioning device is required to form the systematic bits and parity bits in separate groups. The data processing in terms of bit size in the transmitter 110 illustrated in FIG. 11A is illustrated in FIG. 11B.

Figure 12A:
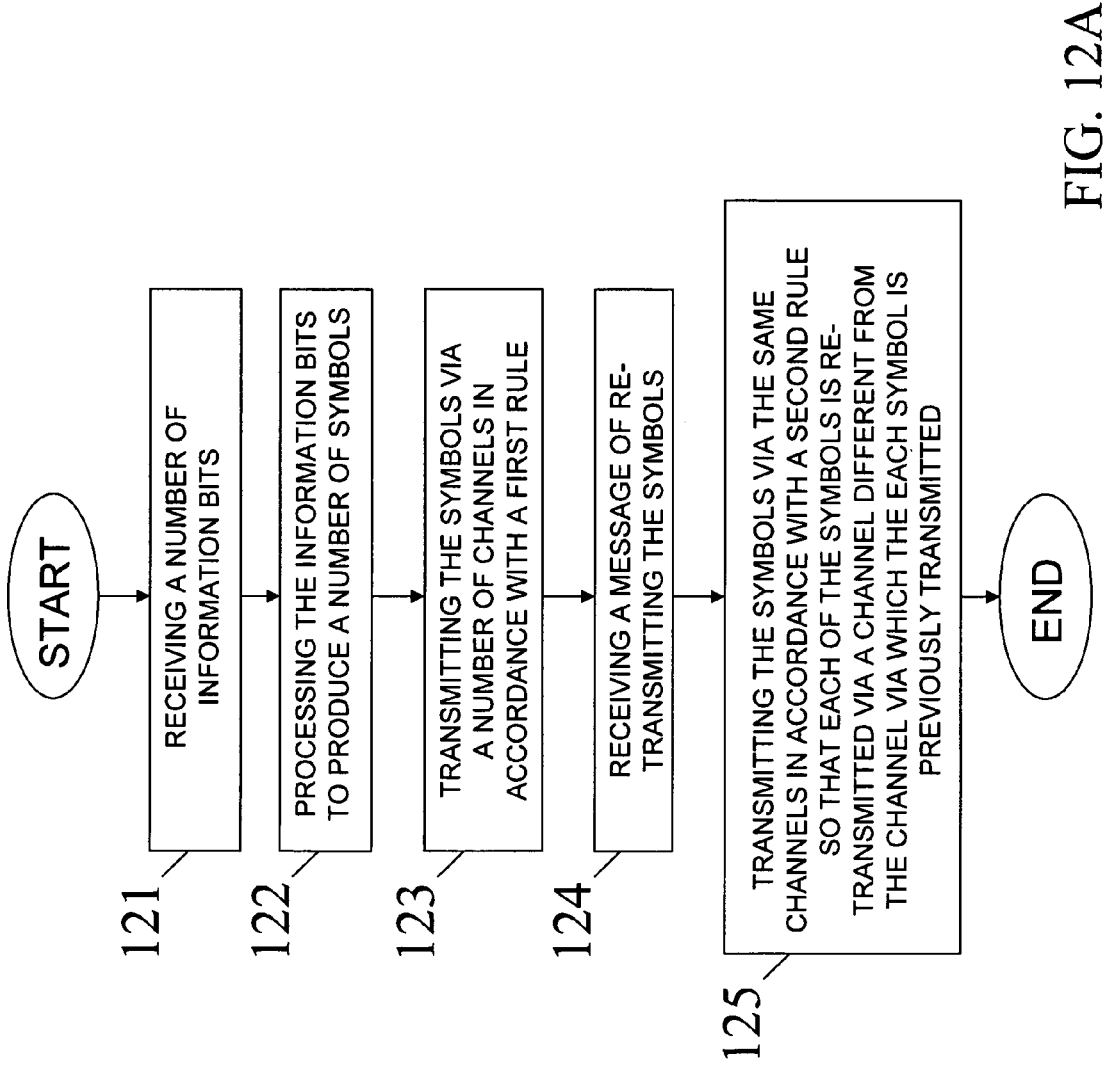
FIG. 12A is a flow diagram illustrating a method of data transmission in accordance with an example of the present invention.

FIG. 12A is a flow diagram illustrating a method of data transmission in accordance with an example of the present invention. Referring to FIG. 12A, a number of information bits may be received at step 121. At step 122, the information bits may then be processed by subsequent processes such as, for example, encoding, splitting, rate-matching, interleaving, modulating and layer-mapping, to produce a number of symbols. The symbols may be arranged in a symbol sequence in a fashion similar to that for the symbols $N_1$/nm before transmission via channels 1 to p illustrated in FIG. 4B. Next, the symbols may be transmitted via a number of channels in accordance with a first rule at step 123. The channels may be different from one another in channel conditions. The channel conditions of the channels in one example may be identified by a controller based on a feedback signal. At step 124, a message of re-transmitting the symbols may be received from a receiver due to, for example, undesirable channel conditions. At step 125, the symbols may then be re-transmitted via the same channels in accordance with a second rule in a hybrid automatic request (HARQ) scheme. The second rule is different from the first rule so that each of the symbols may be re-transmitted via a second channel different from a first channel via which the each symbol is previously transmitted. The first rule and the second rule are discussed below.

Figures 1, 12B:
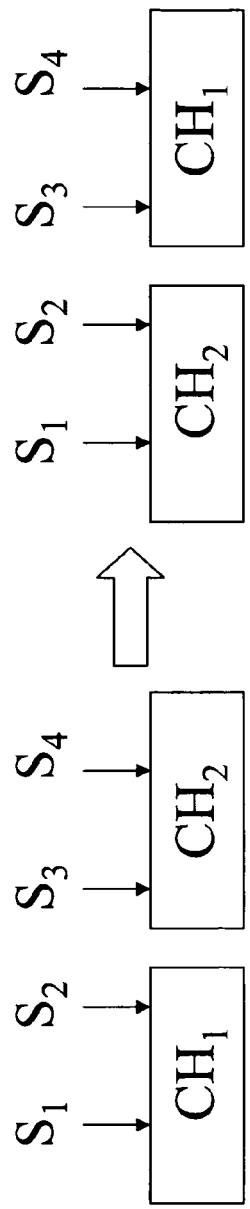
FIGS. 12B-1 to 12B-4 are schematic diagrams illustrating exemplary operations of the method illustrated in FIG. 12A.
Figures 2, 12B:
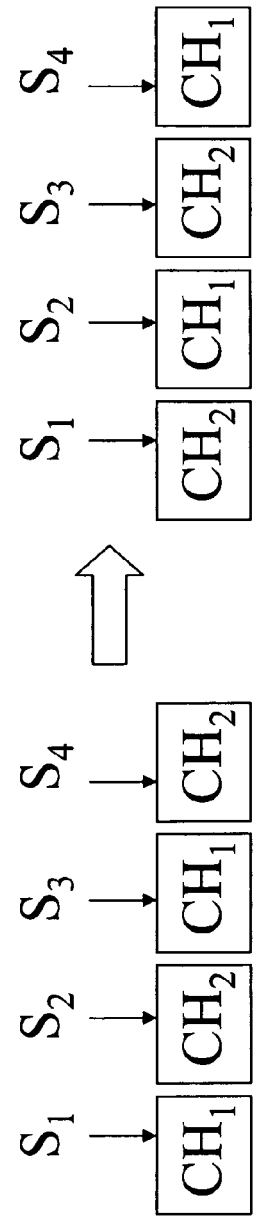
Figures 3, 12B:
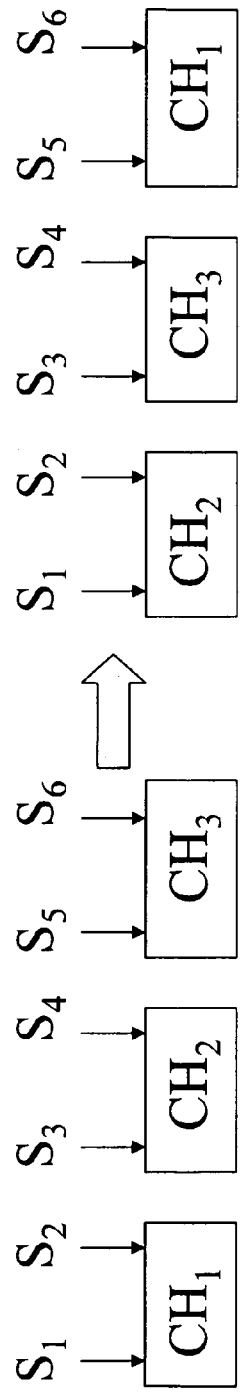
Figures 4, 12B:
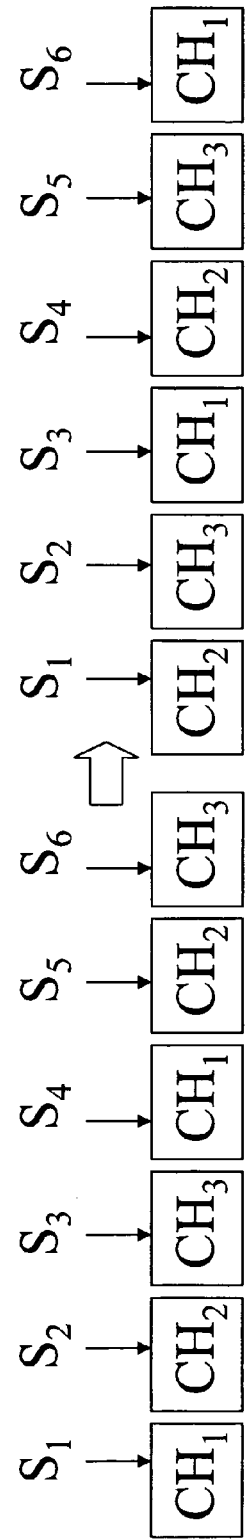

FIGS. 12B-1 to 12B-4 are schematic diagrams illustrating exemplary operations of the method illustrated in FIG. 12A. Referring to FIG. 12B-1, it may be assumed that based on a first rule symbols $S_1$ and $S_2$ are transmitted via a first channel denoted as $CH_1$, while symbols $S_3$ and $S_4$ are transmitted via a second channel denoted as $CH_2$. The channels $CH_1$ and $CH_2$ may be different from each other in channel condition. When the symbols $S_1$ to $S_4$ are re-transmitted, a second rule different from the first rule may be used. Specifically, the symbols $S_1$ and $S_2$ are re-transmitted via the second channel $CH_2$, while the symbols $S_3$ and $S_4$ are re-transmitted via the first channel $CH_1$. Consequently, each of the symbols $S_1$ to $S_4$ are re-transmitted via a channel different from a previous one.

Referring to FIG. 12B-2, it may be assumed that based on a first rule the symbols $S_1$, $S_2$, $S_3$ and $S_4$ are transmitted via $CH_1$, $CH_2$, $CH_1$ and $CH_2$, respectively. When the symbols $S_1$ to $S_2$, re-transmitted, based on a second rule different from the first rule, the symbols $S_1$, $S_2$, $S_3$ and $S_4$ are re-transmitted via $CH_2$, $CH_1$, $CH_2$ and $CH_1$, respectively.

Referring to FIG. 12B-3, it may be assumed that based on a first rule the symbols $S_1$, $S_2$, $S_3$, $S_4$, $S_5$ and $S_6$ are transmitted via $CH_1$, $CH_1$, $CH_2$, $CH_2$, $CH_3$ and $CH_3$, respectively. The channels $CH_1$, $CH_2$ and $CH_3$ may be different from one another in channel condition. When the symbols $S_1$ to $S_6$ are re-transmitted, based on a second rule different from the first rule, the symbols $S_1$, $S_2$, $S_3$, $S_4$, $S_5$ and $S_6$ are re-transmitted via $CH_2$, $CH_2$, $CH_3$, $CH_3$, $CH_1$ and $CH_1$, respectively. Consequently, each of the symbols $S_1$ to $S_6$ are re-transmitted via a channel different from a previous one.

Referring to FIG. 12B-4, it may be assumed that based on a first rule the symbols $S_1$, $S_2$, $S_3$, $S_4$, $S_5$ and $S_6$ are transmitted via $CH_1$, $CH_2$, $CH_3$, $CH_1$, $CH_2$ and $CH_3$, respectively. When the symbols $S_1$ to $S_6$ are re-transmitted, based on a second rule different from the first rule, the symbols $S_1$, $S_2$, $S_3$, $S_4$, $S_5$ and $S_6$ are re-transmitted via $CH_2$, $CH_3$, $CH_1$, $CH_2$, $CH_3$ and $CH_1$, respectively.

Figure 13A:
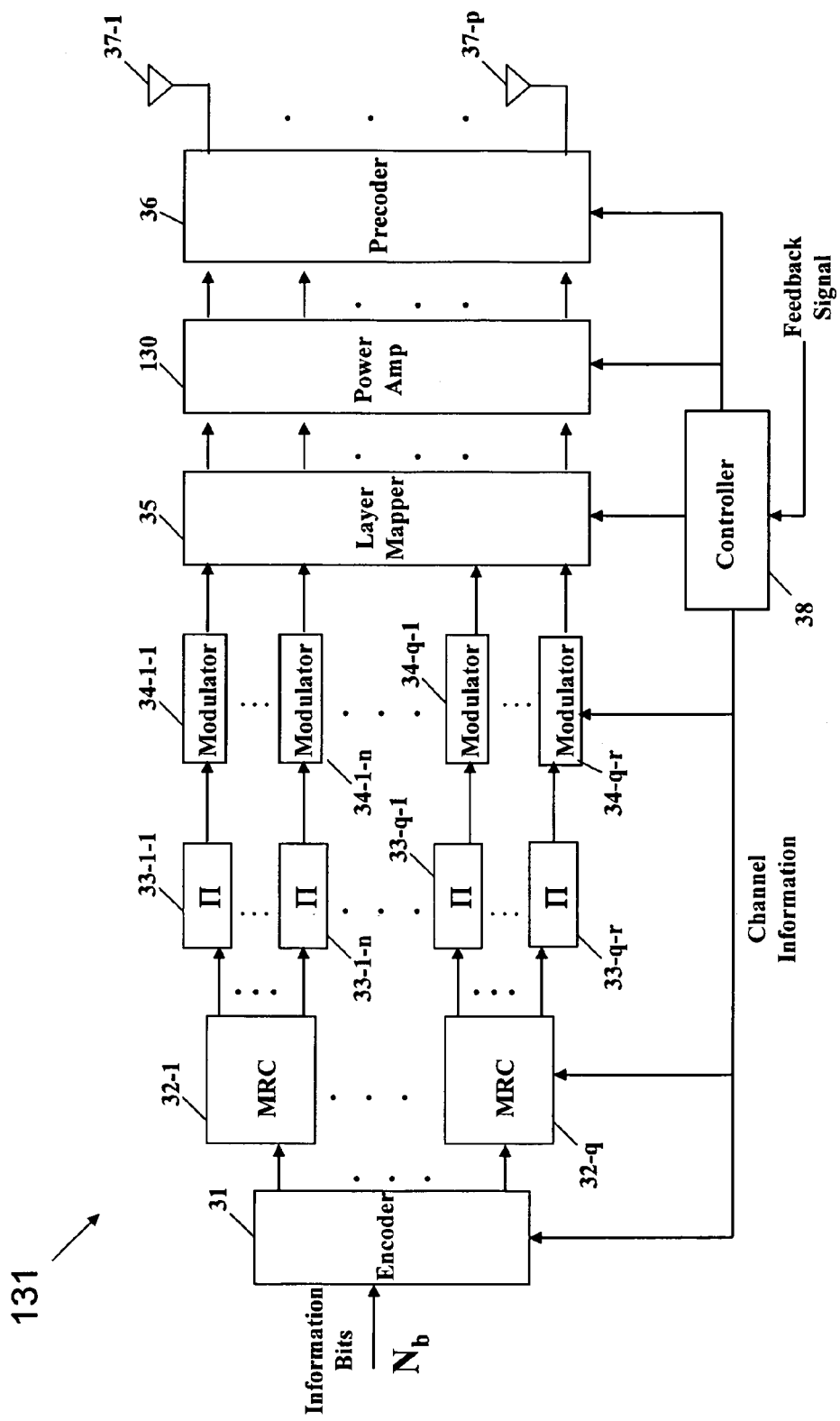
FIGS. 13A to 13F are schematic block diagrams of transmitters for data processing in a multi-channel communication system in accordance with examples of the present invention.

FIGS. 13A to 13F are schematic block diagrams of transmitters 131 to 136 for data processing in a multi-channel communication system in accordance with examples of the present invention. Referring to FIG. 13A, the transmitter 131 may be similar to the transmitter 3 described and illustrated with reference to FIG. 3A except that, for example, a power amplifier 130 is added between the layer mapper 35 and the precoder 36. Furthermore, the channel information on channel conditions may be sent from the controller 38 to the power amplifier 130 to facilitate power allocation. The power amplifier 130 may be configured to allocate power among the channels based on the channel conditions. In one example according to the present invention, the power amplifier 130 may allocate a predetermined amount of power based on a first rule that a larger amount of power is allocated to a channel with a better channel condition. In another example, the power amplifier 130 may allocate a predetermined amount of power based on a second rule that a smaller amount of power is allocated to a channel with a better channel condition. The power amplifier 130 may perform the first rule of power allocation based on an algorithm called "water-filling" algorithm, and may perform the second rule of power allocation based on an inverse result of the water-filling algorithm. Reference of the water-filling algorithm may be found in "Capacity of Multi-antenna Gaussian Channels" by I. E. Telatar, Tech Repo., AT&T Bell Labs, 1995.

Figure 13B:
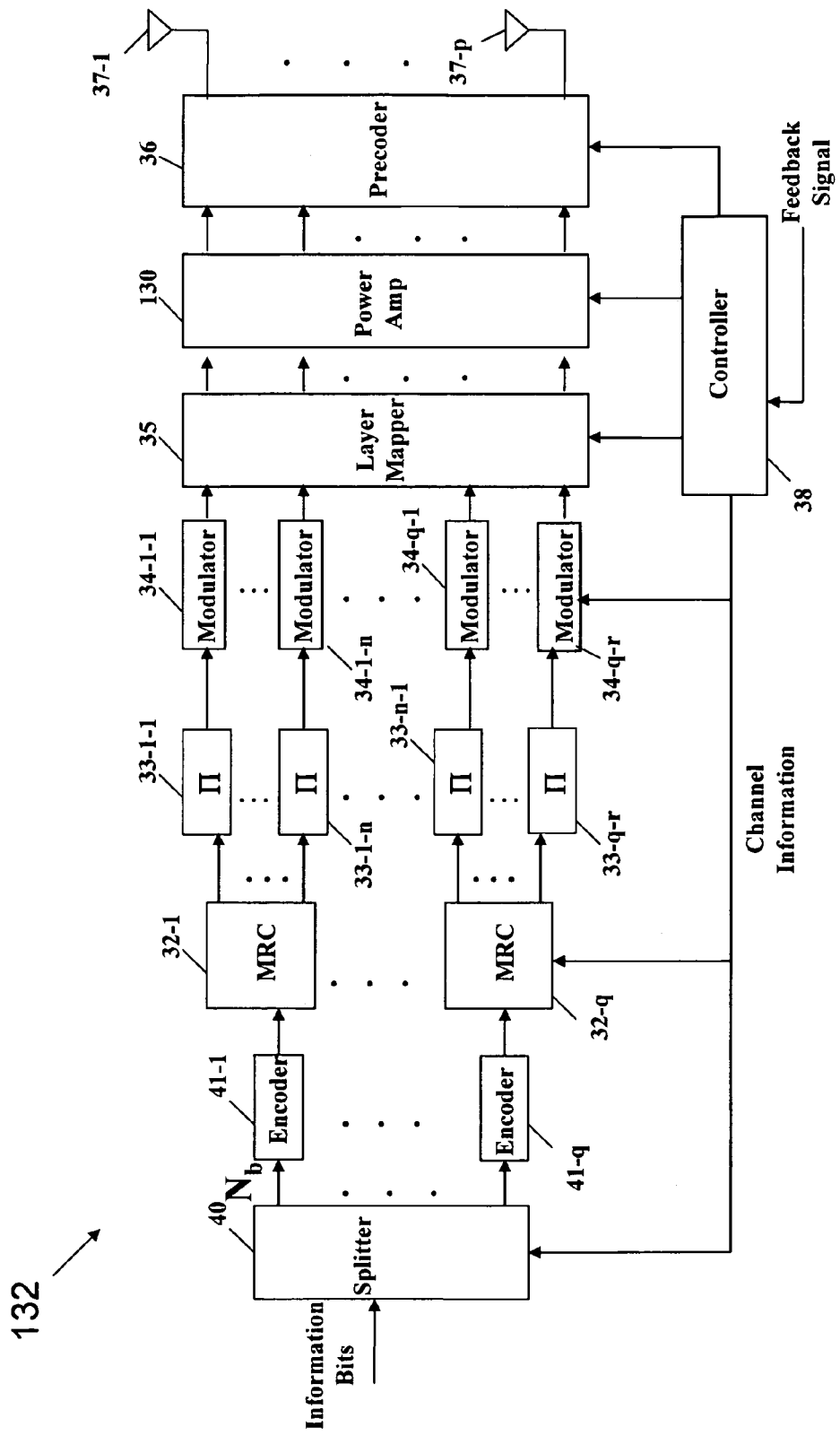

Referring to FIG. 13B, the transmitter 132 may be similar to the transmitter 3-1 described and illustrated with reference to FIG. 3B except that, for example, the power amplifier 130 is added between the layer mapper 35 and the precoder 36. Furthermore, the channel information on channel conditions may be sent from the controller 38 to the power amplifier 130 to facilitate power allocation. The power amplifier 130 may allocate a predetermined amount of power among the channels based on one of the first rule and the second rule.

Figure 13C:
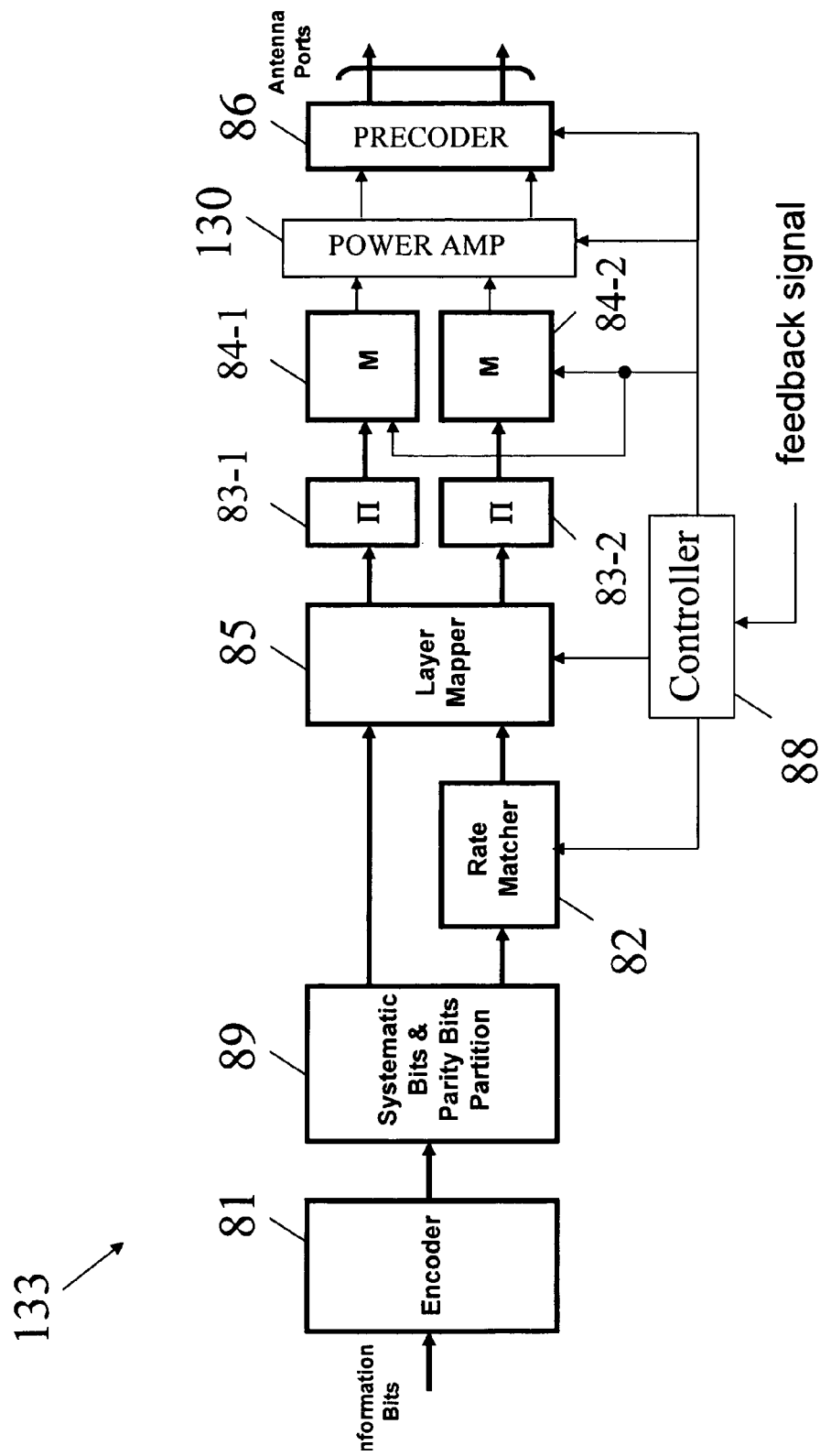

Referring to FIG. 13C, the transmitter 133 may be similar to the transmitter 80 described and illustrated with reference to FIG. 8A except that, for example, the power amplifier 130 is added between the modulators 84-1 and 84-2 and the precoder 86. Furthermore, the channel information on channel conditions may be sent from the controller 88 to the power amplifier 130 to facilitate power allocation. Specifically, the power amplifier 130 based on the first rule may allocate a larger portion of power to a first channel for transmitting a first group of bits, which may be relatively important bits, and a smaller portion of power to a second channel for transmitting a second group of bits, which may be relatively less important bits. Furthermore, the power amplifier 130 based on the second rule may allocate a smaller portion of power to the first channel for transmitting the first group of bits, which may be relatively important bits, and a larger portion of power to the second channel for transmitting the second group of bits, which may be relatively less important bits.

Figure 13D:
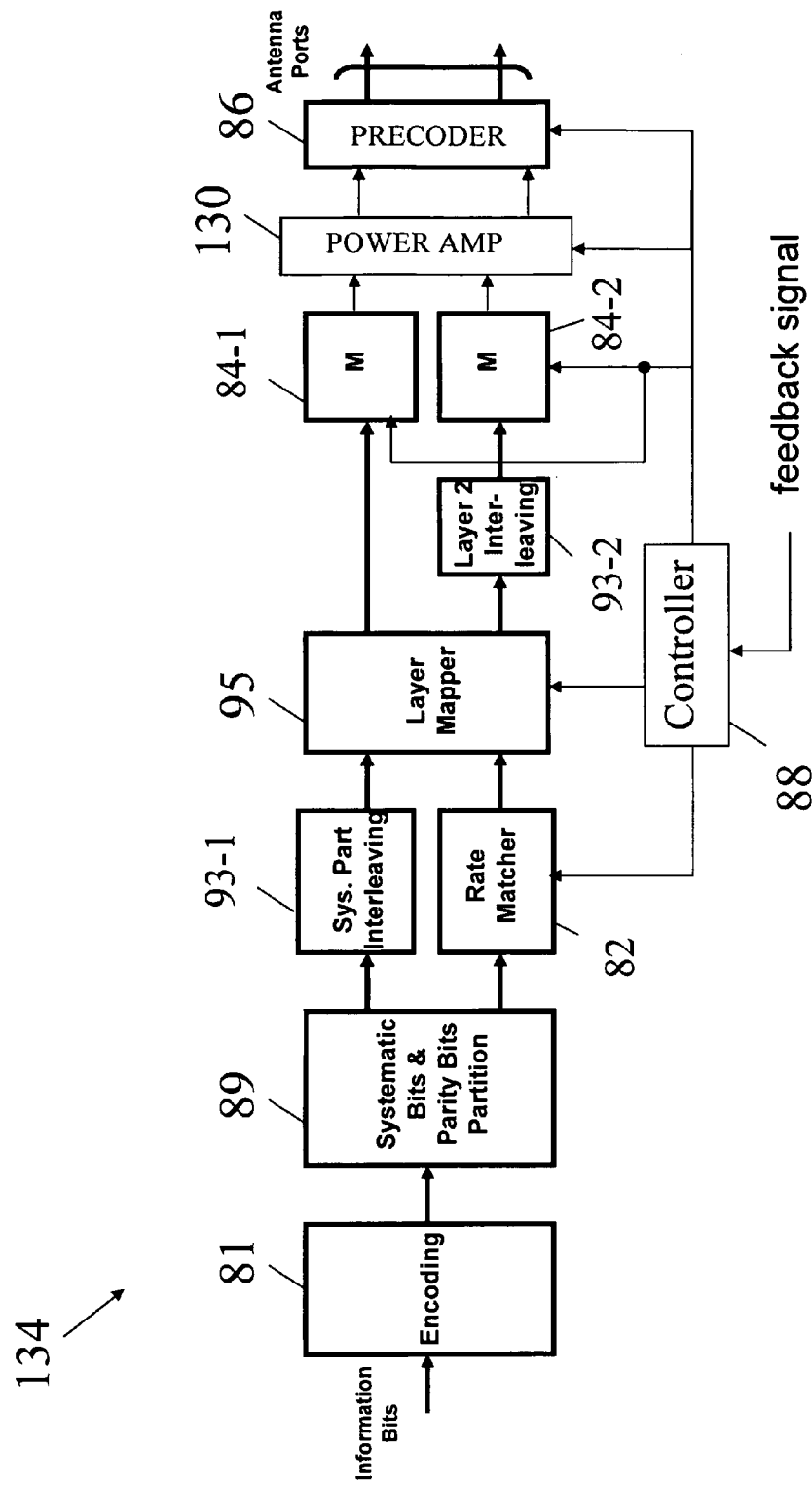

Referring to FIG. 13D, the transmitter 134 may be similar to the transmitter 90 described and illustrated with reference to FIG. 9A except that, for example, the power amplifier 130 is added between the modulators 84-1 and 84-2 and the precoder 86. Furthermore, the channel information on channel conditions may be sent from the controller 88 to the power amplifier 130 to facilitate power allocation. Specifically, the power amplifier 130 based on the first rule may allocate a larger portion of power to a first channel for transmitting relatively important bits, and a smaller portion of power to a second channel for transmitting relatively less important bits. Furthermore, the power amplifier 130 based on the second rule may allocate a smaller portion of power to the first channel for transmitting the relatively important bits, and a larger portion of power to the second channel for transmitting the relatively less important bits.

Figure 13E:
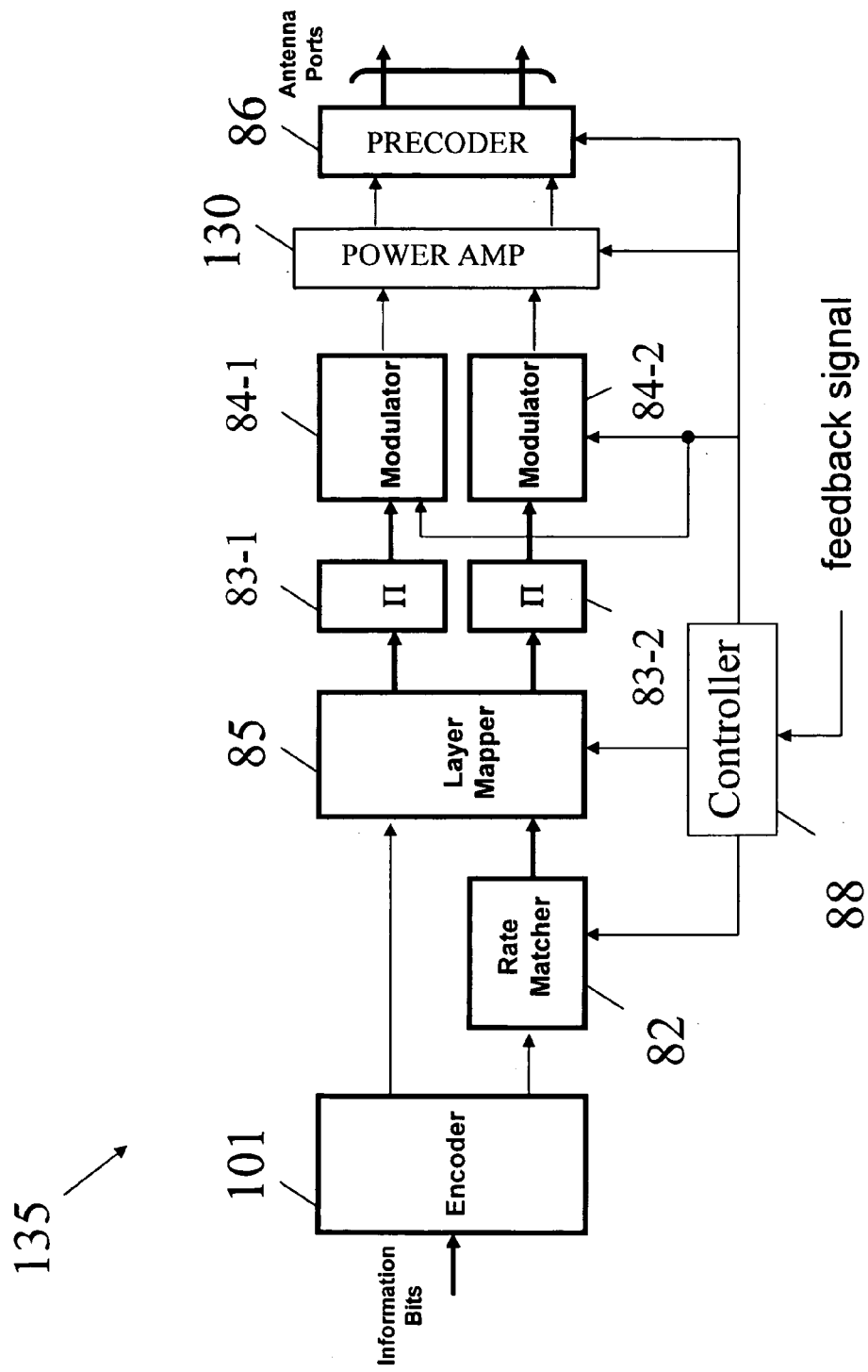

Referring to FIG. 13E, the transmitter 135 may be similar to the transmitter 100 described and illustrated with reference to FIG. 10A except that, for example, the power amplifier 130 is added between the modulators 84-1 and 84-2 and the precoder 86. Furthermore, the channel information on channel conditions may be sent from the controller 88 to the power amplifier 130 to facilitate power allocation. Specifically, the power amplifier 130 based on the first rule may allocate a larger portion of power to a first channel for transmitting relatively important bits, and a smaller portion of power to a second channel for transmitting relatively less important bits. Furthermore, the power amplifier 130 based on the second rule may allocate a smaller portion of power to the first channel for transmitting the relatively important bits, and a larger portion of power to the second channel for transmitting the relatively less important bits.

Figure 13F:
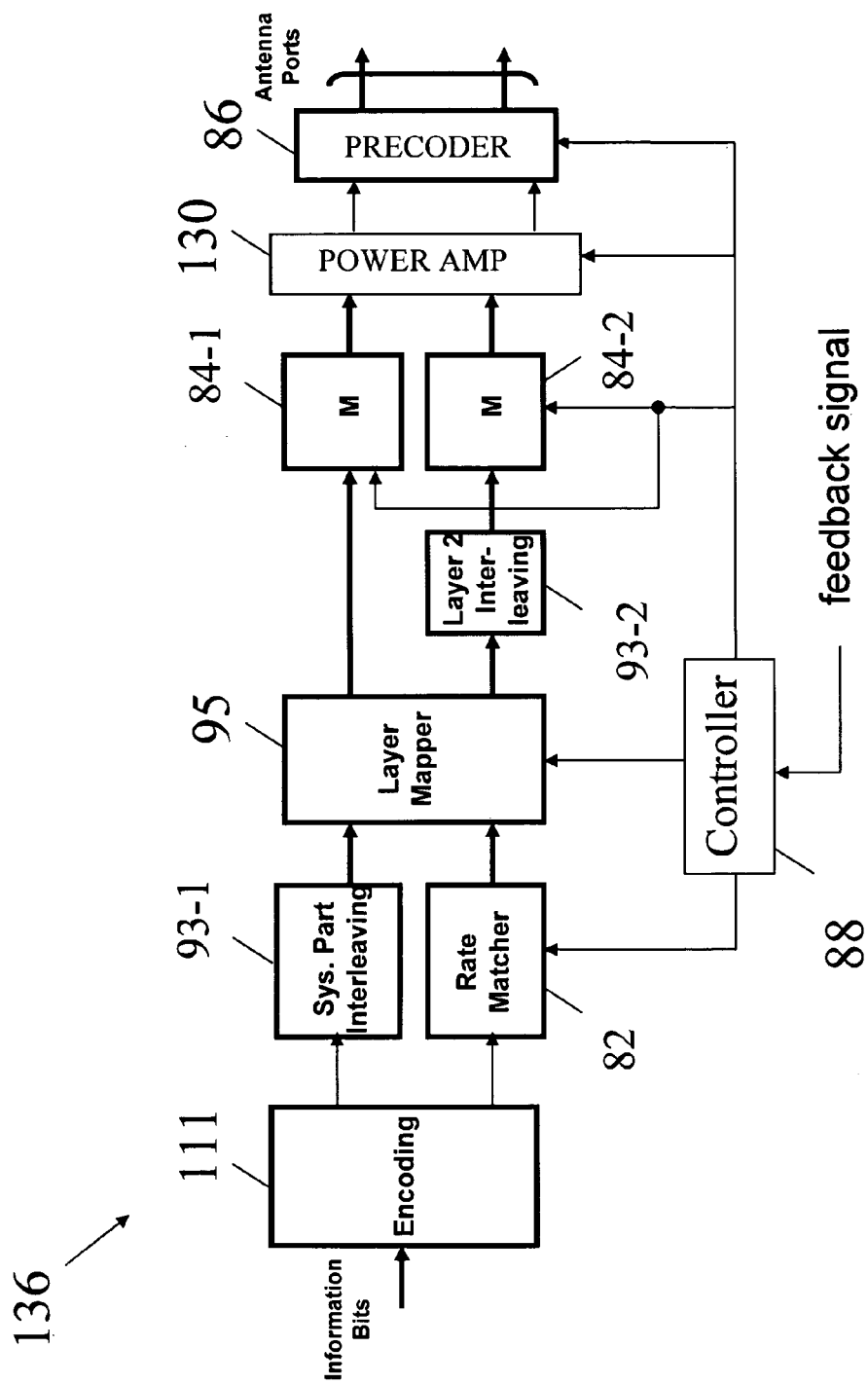

Referring to FIG. 13F, the transmitter 136 may be similar to the transmitter 110 described and illustrated with reference to FIG. 11A except that, for example, the power amplifier 130 is added between the modulators 84-1 and 84-2 and the precoder 86. Furthermore, the channel information on channel conditions may be sent from the controller 88 to the power amplifier 130 to facilitate power allocation. Specifically, the power amplifier 130 based on the first rule may allocate a larger portion of power to a first channel for transmitting relatively important bits, and a smaller portion of power to a second channel for transmitting relatively less important bits. Furthermore, the power amplifier 130 based on the second rule may allocate a smaller portion of power to the first channel for transmitting the relatively important bits, and a larger portion of power to the second channel for transmitting the relatively less important bits.

Figure 14:
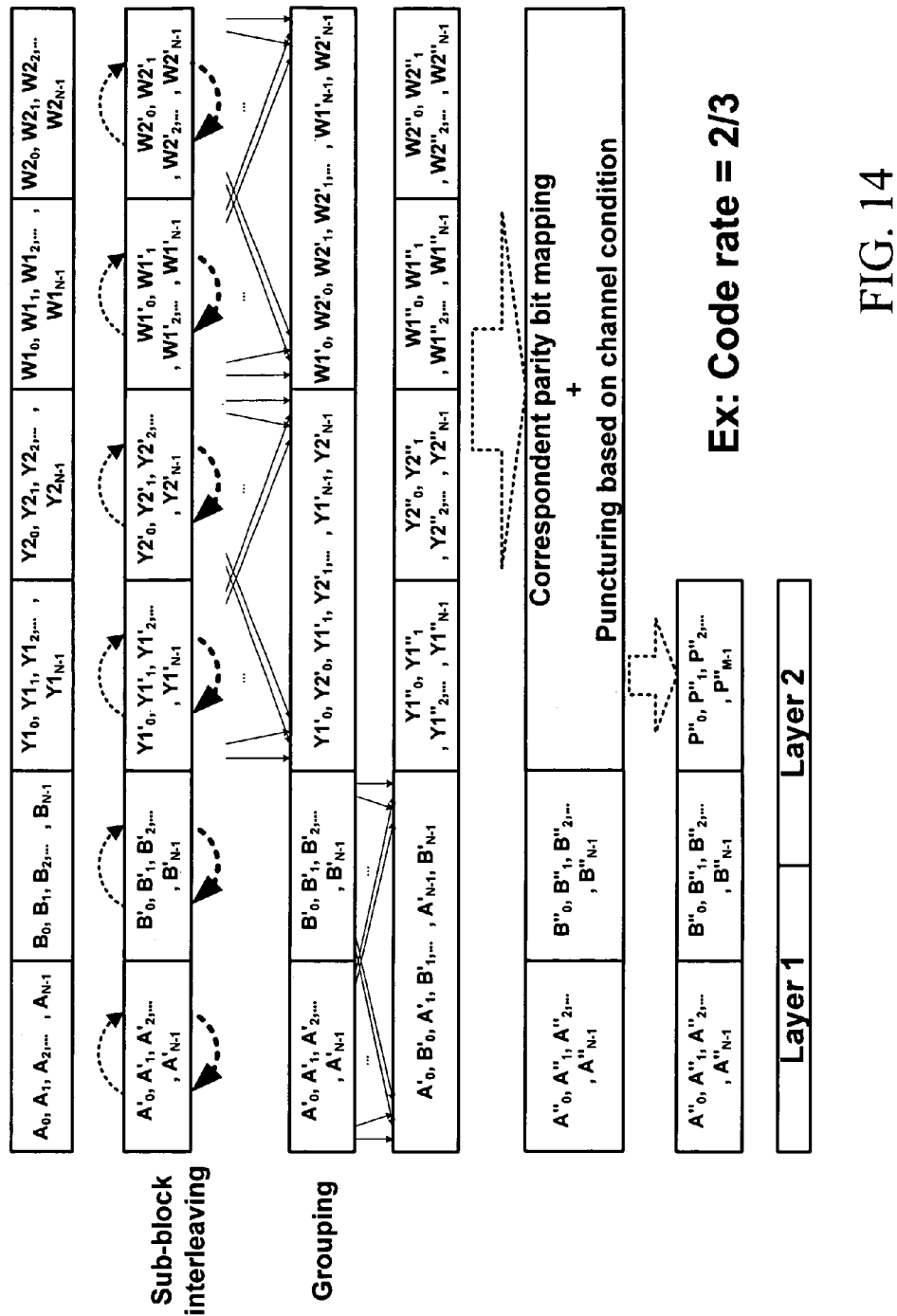
FIG. 14 is a flow diagram illustrating a method of data transmission in accordance with still another example of the present invention.

FIG. 14 is a flow diagram illustrating a method of data transmission in accordance with still another example of the present invention. Referring to FIG. 14, the data processing may be similar to that in FIG. 8E except that, for example, a CTC scheme may be used. In the present example, coded bits $A_0$ to $A_{N-1}$ and $B_0$ to $B_{N-1}$ may be similar to the systematic bits S, and coded bits $Y1_0$ to $Y1_{N-1}$, $Y2_0$ to $Y2_{N-1}$, $W1_0$ to $W1_{N-1}$, and $W2_0$ to $W2_{N-1}$ may be similar to parity bit interleaving and grouping, systematic bits $A''_0$ to $A''_{N-1}$ may be allocated to the layer 1 and a portion of the systematic bits $B''_0$ to $B''_{N-1}$ may be allocated to the layer 2. Furthermore, parity bits related to systematic bits $A''_0$ to $A''_{N-1}$ may be more punctured than those related to the systematic bits $B''_0$ to $B''_{N-1}$. Moreover, the ratio of un-punctured parity bits related to $A''_0$ to $A''_{N-1}$ to un-punctured parity bits related to $B''_0$ to $B''_{N-1}$ may be identified by the ratio of the size of systematic bits allocated to the layer 1 to the size of systematic bits allocated to the layer 2.

It will be appreciated by those skilled in the art that changes could be made to the preferred embodiments described above without departing from the broad inventive concept thereof. It is understood, therefore, that this invention is not limited to the particular embodiments disclosed, but is intended to cover modifications within the spirit and scope of the present application as defined by the appended claims.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

We claim:

1. An apparatus for data processing in a multi-channel communication system, the apparatus comprising:
    at least one encoder configured to encode a number of bits for transmission via channels in the multi-channel communication system into coded bits and split the coded bits into a number of first groups of bits at a first ratio;
    a plurality of first rate units coupled to the encoder, each of the first rate units being configured to adjust one portion of the first groups of bits in size at least one rate; and
    a controller configured to assign the first ratio to the encoder and the at least one rate to each of the first rate units based on conditions of the channels,
    wherein each of the first rate units
    comprises the following components:
        a splitter configured to split the one portion of the first groups of bits into a number of second groups of bits at a second ratio; and
        a number of first matching devices coupled to the splitter, each of the first matching devices being configured to adjust one portion of the second groups of bits in size at a first rate,
        wherein the controller is configured to assign the second ratio and the first rate;
    or comprises the following components:
        a first matching device configured to adjust the one portion of the first groups of bits in size at a first rate;
        a splitter configured to split an output group of bits from the first matching device into a number of second groups of bits at a second ratio; and
        a number of second matching devices coupled to the splitter, each of the second matching devices being configured to adjust one portion of the second groups of bits in size at a second rate,
        wherein the controller is configured to assign the first rate, the second ratio and the second rate;
    or comprises the following components:
        a first matching device configured to adjust the one portion of the first groups of bits in size at a first rate;
        an interleaver configured to interleave an output group of bits from the first matching device; and
        a splitter configured to split an output group of bits from the interleaver into a number of second groups of bits at a second ratio,
        wherein the controller is configured to assign the first rate and the second ratio.

2. The apparatus of claim 1 further comprising at least one second rate unit coupled to each of the first rate units, wherein the each of the first rate units and the at least one second rate unit are arranged in a hierarchical structure.

3. The apparatus of claim 1 further comprising a power amplifier coupled to the controller, wherein the power amplifier is configured to allocate a predetermined amount of power to the channels at different ratios.

4. An apparatus for data processing in a multi-channel communication system, the apparatus comprising:
    a first splitter configured to split a number of bits for transmission via channels in the multi-channel communication system into a number of first groups of bits at a first ratio;
    a number of encoders coupled to the first splitter, each of the encoders being configured to encode one portion of the first groups of bits into a second group of bits;
    a number of first rate units each coupled to one of the encoders, each of the first rate units being configured to adjust the second group of bits from the one encoder in size at at least one rate; and
    a controller configured to assign the first ratio to the splitter and the at least one rate to each of the first rate units based on conditions of the channels
    wherein each of the first rate units
    comprises the following components:
        a second splitter configured to split the second group of bits from the one encoder into a number of third groups of bits at a second ratio; and
        a number of first matching devices coupled to the second splitter, each of the first matching devices being configured to adjust one of the third groups of bits in size at a first rate,
    wherein the controller is configured to assign the second ratio and the first rate;
    or comprises the following components:
        a first matching device configured to adjust the second group of bits from the one encoder in size at a first rate;
        a second splitter configured to split an adjusted second group of bits from the first matching device into a number of third groups of bits at a second ratio; and
        a number of second matching devices coupled to the second splitter, each of the second matching devices being configured to adjust one of the third groups of bits in size at a second rate,
    wherein the controller is configured to assign the first rate, the second ratio and the second rate;
    or comprises the following components:
        a first matching device configured to adjust the second group of bits from the one encoder in size at a first rate;
        an interleaver configured to interleave an output group of bits from the first matching device; and
        a second splitter configured to split an output group of bits from the interleaver into a number of third groups of bits at a second ratio, wherein the controller is configured to assign the first rate and the second ratio.

5. An apparatus for data processing in a multi-channel communication system, the apparatus comprising:
an encoder configured to encode a number of bits for transmission via at least a first channel and a second channel in the multi-channel communication system into a plurality of coded bits at a code rate, the coded bits including at least a portion of a first group of bits and at least a portion of a second group of bits, wherein the first group of bits has a greater influence on a communication quality than the second group of bits;
a rate unit coupled to the encoder;
a layer mapper coupled to the rate unit; and
a controller coupled to the layer mapper, wherein
the rate unit is configured to:
adjust a first portion of the second group of bits at a first rate, and
allocate a first portion of the first group of bits for mapping to a first layer of the layer mapper and the adjusted first portion of the second group of bits for mapping to a second layer of the layer mapper, and
the layer mapper is configured to map the first portion of the first group of bits allocated by the rate unit to the first layer of the layer mapper and the adjusted first portion of the second group of bits allocated by the rate unit to the second layer of the layer mapper, and
wherein the bits mapped to the first layer of the layer mapper are transmitted via one of the first channel and the second channel and the bits mapped to the second layer of the layer mapper are transmitted via the other one of the first channel and the second channel.

6. The apparatus of claim 5, wherein the rate unit is further configured to:
allocate a second portion of the first group of bits for mapping to the second layer of the layer mapper and adjust a second portion of the second group of bits at a second rate and allocate the adjusted second portion of the second group of bits for mapping to the second layer of the layer mapper if a size of the first group of bits is greater than a length of the fist layer, and
adjust the second portion of the second group of bits at a third rate and allocate the adjusted second portion of the second group of bits for mapping to the first layer of the layer mapper if the size of the first group of bits is less than the length of the first layer; and
the layer mapper is further configured to:
map the second portion of the first group of bits allocated by the rate unit to the second layer of the layer mapper and map the adjusted second portion of the second group of bits allocated by the rate unit to the second layer of the layer mapper if the size of the first group of bits is greater than the length of the first layer, and
map the adjusted second portion of the second group of bits allocated by the rate unit to the first layer of the layer mapper if the size of the first group of bits is less than the length of the first layer.

7. The apparatus of claim 5, wherein the controller is configured to:
receive a signal containing information on conditions of the first channel and second channel, assign the code rate to the encoder, determine the first rate and second rate based on the number of information bits and total length of the first layer and the second layer of the layer mapper.

8. The apparatus of claim 6, wherein the third rate is equal to the first rate.

9. The apparatus of claim 7, wherein the at least a portion of first group of bits includes systematic bits and the at least a portion of second group of bits include parity bits.

10. The apparatus of claim 9, wherein a first portion of the parity bits and a second portion of the parity bits are related to the first portion of the systematic bits and the second portion of the systematic bits, respectively.

11. The apparatus of claim 10, wherein a ratio of the first portion of the second group of bits to the second portion of the second group of bits is approximately equivalent to a ratio of the second portion of the first group of bits to the first portion of the first group of bits.

12. The apparatus of claim 11, wherein the ratio of the first portion of the second group of bits to the second portion of the second group of bits is further approximately equivalent to $(1-CR)/CR$, where CR is the code rate of the encoder.

13. The apparatus of claim 7, wherein the bits mapped to the first layer of the layer mapper are transmitted in a channel having the superior channel condition.

14. The apparatus of claim 7, wherein the first rate, second rate and the third rate include a predetermined value.

15. The apparatus of claim 5, wherein each of the at least a portion of the first group of bits is transmitted in accordance with a symbol sequence via a number of channels in a first sequence of the channels;
a message of re-transmitting the each of the at least a portion of the first group of bits is received; and
the each of the at least a portion of the first group of bits is re-transmitted in accordance with the symbol sequence via the channels in a second sequence of the channels, the first sequence and the second sequence being different from each other.

16. The apparatus claim of claim 5, wherein each of the at least a portion of the first group of bits and each of the at least a portion of the second group of bits is transmitted in accordance with a symbol sequence via a number of channels in a first sequence of the channels; and the each of the at least a portion of the first group of bits and the at least a portion of the second group of bits is re-transmitted in accordance with the symbol sequence via the channels in a second sequence of the channels.

17. The apparatus of claim 15 is further configured to:
transmit a first half of the each of the at least a portion of the first group of bits via a first channel and a second half of the each of the at least a portion of the first group of bits via a second channel; and
retransmit the first half of the each of the at least a portion of the first group of bits via the second channel and the second half of the each of the at least a portion of the first group of bits via the first channel.

18. The apparatus of claim 15 is further configured to:
transmit odd-numbered portions of the first group of bits via the first channel and even-numbered portions of the first group of bits via the second channel; and
retransmit the odd-numbered portions of the first group of bits via the second channel and the even-numbered portions of the first group of bits via the first channel.

19. The apparatus of claim 15 is further configured to:
transmit a first consecutive portion of the each of the at least a portion of the first group of bits via the first channel, a second consecutive portion of the each of the at least a portion of the first group of bits via the second channel and a third consecutive portion of the each of the at least one portion of the first group of bits via a third channel; and
retransmit the first consecutive portion of the each of the at least a portion of the first group of bits via the second channel, the second consecutive portion of the each of the at least portion of the first group of bits via the third channel and the third consecutive portion of the each of the at least a portion of the first group of bits via the first channel.

20. The apparatus of claim 15 is further configured to:

transmit an N-th one of the each of the at least a portion of the first group of bits via an M-th one of the channels including a number of K channels, N, M and K being positive integers; and retransmit the N-th one of the each of the at least a portion of the first group of bits via an (M+1)-th one of the channels if (M+1) is not greater than K, and retransmitting the N-th one of the each of the at least one portion of the first group of bits via a first one of the channels is (M+1) is greater than K.

21. The apparatus of claim 6, wherein the controller is configured to:

receive a signal containing information on conditions of the first channel and second channel, assign the code rate to the encoder, determine the first rate and second rate based on a number of information bits and total length of the first layer and the second layer of the layer mapper.

22. The apparatus of claim 8, wherein the first rate, second rate and the third rate include a predetermined value.

23. A method for data processing in a multi-channel communication system, comprising:

encoding a number of bits for transmission via at least a first channel and a second channel in the multi-channel communication system into a plurality of coded bits at a code rate, the coded bits including at least a portion of a first group of bits and at least a portion of a second group of bits, wherein the first group of bits has a greater influence on a communication quality than the second group of bits;

providing a rate unit for receiving the plurality of coded bits;

providing a layer mapper coupled to the rate unit;

adjusting a first portion of the second group of bits at a first rate;

allocating a first portion of the first group of bits for mapping to a first layer of the layer mapper and the adjusted first portion of the second group of bits for mapping to a second layer of the layer mapper; and mapping the first portion of the first group of bits allocated by the rate unit to the first layer of the layer mapper and the adjusted first portion of the second group of bits allocated by the rate unit to the second layer of the layer mapper, wherein the bits mapped to the first layer of the layer mapper are transmitted via one of the first channel and the second channel and the bits mapped to the second layer of the layer mapper are transmitted via the other one of the first channel and the second channel.

24. The method claim as claimed in claim 23, further comprising, allocating a second portion of the first group of bits for mapping to the second layer of the layer mapper, adjusting a second portion of the second group of bits at a second rate, allocating the adjusted second portion of the second group of bits for mapping to the second layer of the layer mapper if a size of the first group of bits is greater than a length of the first layer, adjusting the second portion of the second group of bits at a third rate, allocating the adjusting second portion of the second group of bits for mapping to the first layer if the size of the first group of bits is less than the length of the first layer, mapping the second portion of the first group of bits allocated by the rate unit to the second layer of the layer mapper, mapping the adjusting second portion of the second group of bits allocated by the rate unit to the second layer of the layer mapper if the size of the first group of bits is greater than the length of the first layer, and mapping the adjusted second portion of the second group of bits allocated by the rate unit to the first layer of the layer mapper if the size of the first group of bits is less than the length of the first layer.

25. The method as claimed in claim 23, further comprising, receiving a signal containing information on conditions of the first channel and second channel, assigning the code rate to an encoder, and determining the first rate and second rate based on a number of information bits and total length of the first layer and the second layer of the layer mapper.

26. The method claim as claimed in claim 24, wherein the third rate is equal to the first rate.

27. The method claim as claimed in claim 25, wherein the at least a portion of first group of bits includes systematic bits and the at least a portion of a second group of bits include parity bits.

28. The method claim as claimed in claim 27, wherein a first portion of the parity bits and a second portion of the parity bits are related to the first portion of the systematic bits and the second portion of the systematic bits, respectively.

29. The method claim as claimed in claim 28, wherein a ratio of the first portion of the second group of bits to the second portion of the second group of bits is approximately equivalent to a ratio of the second portion of the first group of bits to the first portion of the first group of bits.

30. The method claim as claimed in claim 29, wherein the ratio of the first portion of the second group of bits to the second portion of the second group of bits is further approximately equivalent to (1−CR)/CR, where CR is the code rate of the encoder.

31. The method claim as claimed in claim 25, wherein the bits mapped to the first layer of the layer mapper are transmitted in a channel having the superior channel condition.

32. The method claim as claimed in claim 25, wherein the first rate, second rate and the third rate include a predetermined value.

33. The method as claimed in claim 24, further comprising, receiving a signal containing information on conditions of the first channel and second channel, assigning the code rate to an encoder, and determining the first rate and second rate based on a number of information bits and total length of the first layer and the second layer of the layer mapper.

34. The method claim as claimed in claim 26, wherein the first rate, second rate and the third rate include a predetermined value.

* * * * *

UNITED STATES PATENT AND TRADEMARK OFFICE
CERTIFICATE OF CORRECTION

| | | |
|---|---|---|
| PATENT NO. | : 8,184,726 B2 | Page 1 of 1 |
| APPLICATION NO. | : 12/177070 | |
| DATED | : May 22, 2012 | |
| INVENTOR(S) | : Hsiao et al. | |

It is certified that error appears in the above-identified patent and that said Letters Patent is hereby corrected as shown below:

Column 17,
Line 42, "fist" should read --first--.

Column 20,
Lines 7 and 13, "adjusting" should read --adjusted--.

Signed and Sealed this
Eleventh Day of September, 2012

David J. Kappos
*Director of the United States Patent and Trademark Office*